(12) United States Patent
Ogawa

(10) Patent No.: US 6,381,079 B1
(45) Date of Patent: Apr. 30, 2002

(54) OPTICAL SYSTEM AND OPTICAL APPARATUS HAVING THE SAME

(75) Inventor: Hideki Ogawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/519,991

(22) Filed: Mar. 7, 2000

(30) Foreign Application Priority Data

Mar. 10, 1999 (JP) ............................................ 11-063289

(51) Int. Cl.$^7$ ........................... G02B 9/04; G02B 13/02; G02B 5/18
(52) U.S. Cl. ........................ 359/795; 359/748; 359/745; 359/569
(58) Field of Search ................................. 359/569, 745, 359/746, 747, 748, 684, 757, 758, 764, 766, 772, 773, 774, 775, 785, 795

(56) References Cited

U.S. PATENT DOCUMENTS

| | | | |
|---|---|---|---|
| 4,348,084 A | 9/1982 | Kitagishi et al. | 359/745 |
| 4,558,928 A | * 12/1985 | Imaizumi | 359/745 |
| 4,610,514 A | 9/1986 | Nakamura | 359/746 |

FOREIGN PATENT DOCUMENTS

| | | |
|---|---|---|
| JP | 55-147606 | 11/1980 |
| JP | 59-65820 | 4/1984 |
| JP | 59-65821 | 4/1984 |

* cited by examiner

*Primary Examiner*—Georgia Epps
*Assistant Examiner*—David N. Spector
(74) *Attorney, Agent, or Firm*—Fitzpatrick, Cella, Harper & Scinto

(57) ABSTRACT

An optical system includes, in order from an object side to an image side, a first lens unit of positive optical power, and a second lens unit of negative refractive power, wherein focusing from an infinitely distant object to a closest object is effected by moving the second lens unit toward the image side along an optical axis, and the second lens unit consists of one negative lens. Further, it is desirable that the following conditions are satisfied:

$$d^2 L_1(\lambda)/d\lambda^2 > 0$$

$$d^2 T_1(\lambda)/d\lambda^2 < 0$$

$$\nu_2 > 30$$

where $L_1(\lambda)$ is an aberration coefficient of longitudinal chromatic aberration of the first lens unit, $T_1(\lambda)$ is an aberration coefficient of lateral chromatic aberration of the first lens unit, $\lambda$ is a wavelength of light, and $\nu_2$ is an Abbe number of material of the negative lens of the second lens unit.

8 Claims, 16 Drawing Sheets

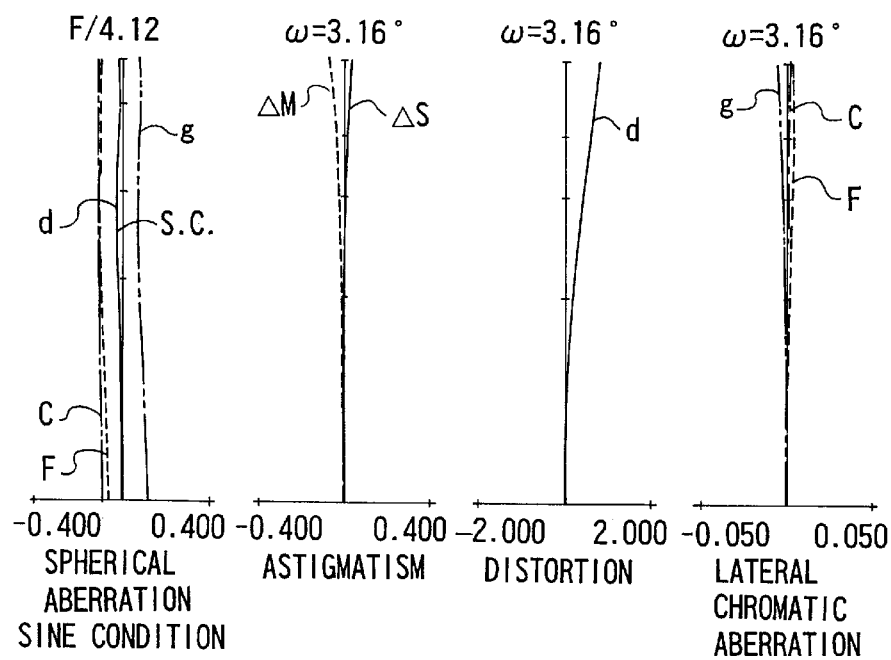
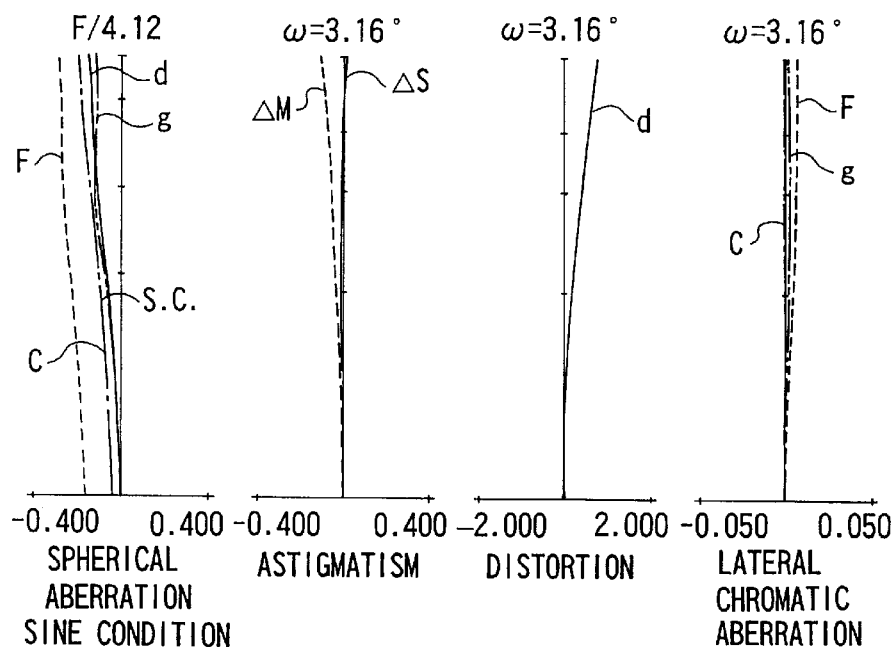

OPTICAL SYSTEM AND OPTICAL APPARATUS HAVING THE SAME

BACKGROUND OF THE INVENTION

1. Field of the Invention

The present invention relates to an optical system adapted for a photographic lens of a silver-halide photographic camera, a video camera, an electronic still camera, a digital camera or the like, and more particularly to a photographic optical system having a high optical performance and optimum for an automatic focusing operation in which focusing is performed by moving a small-sized and light lens unit disposed inside the optical system.

2. Description of Related Art

In general, a focusing operation in many photographic lenses is performed by moving, along an optical axis, the entirety of an optical system or a lens unit which is a part of the optical system.

Among the photographic lenses, in particular, a telephoto lens of long focal length has a tendency to make the size of the whole optical system large and the weight of the lens heavy as compared with a lens system of short focal length.

Accordingly, if, in the telephoto lens, focusing is performed by moving the entirety of an optical system, it becomes necessary to move a large and heavy lens a longer distance according to the long focal length, so that it becomes mechanically difficult to perform focusing speedily.

Therefore, in many telephoto lenses, focusing is performed by moving a lens unit which is a part of an optical system. In particular, there have been proposed a variety of telephoto lenses which adopt the so-called inner focusing method in which focusing is performed by moving a lens unit which is other than a front lens unit of the optical system, is relatively small in lens diameter and relatively light in lens weight, and is located in a middle portion or a relatively rear portion of the optical system.

For example, in Japanese Laid-Open Patent Application No. Sho 55-147606 (corresponding to U.S. Pat. No. 4,348,084), there is disclosed a telephoto lens of the inner focusing type having a focal length of 300 mm and an F-number of 2.8. In Japanese Laid-Open Patent Application No. Sho 59-65820 (corresponding to U.S. Pat. No. 4,610,514) and Japanese Laid-Open Patent Application No. Sho 59-65821 (corresponding to U.S. Pat. No. 4,610,514), there are disclosed telephoto lenses of the inner focusing type having a focal length of 135 mm and an F-number of 2.8 or thereabout.

Each of the telephoto lenses of the inner focusing type disclosed in the above references comprises, in order from the object side, a first lens unit of positive refractive power, a second lens unit of negative refractive power and a third lens unit of positive refractive power, in which focusing is performed by moving the second lens unit along the optical axis.

In general, in telephoto lenses, as the focal length is made longer, or as the total lens length is made shorter for compact size, longitudinal chromatic aberration and lateral chromatic aberration are apt to increase to make the image forming performance worse. Therefore, there have heretofore been proposed a variety of telephoto lenses in which a front lens unit, having a paraxial on-axial ray and a pupil paraxial ray pass at relatively high positions from an optical axis, is composed of a positive lens of low dispersion and a negative lens of high dispersion having extraordinary partial dispersion and made of fluorite or the like.

Further, in many telephoto lenses designed to be mounted on automatic focusing cameras which have been actively developed in recent years, the so-called inner focusing method is adopted in which focusing is performed by moving, along an optical axis, a lens unit which is other than a front lens unit of the optical system, is relatively light in lens weight to make the load torque on a lens barrel small, and is located in a middle portion or a relatively rear portion of the optical system. In addition, in order to realize a higher-speed automatic focusing operation, it is strongly desired to further reduce the weight of a focusing lens unit.

In general, the inner focusing method has such advantages that, since a lens unit used for focusing is small in size and light in weight, the operability of the focusing lens unit is good and the high-speed operation thereof is possible, and there occurs little change of the center of gravity of the entire lens system between focusing on an infinitely distant object and focusing on a closest distance, thereby enabling the telephoto lens to be easily held.

On the other hand, if the inner focusing method is adopted in telephoto lenses, the variation of spherical aberration and chromatic aberration occurring during focusing is apt to increase. In particular, it is relatively difficult to correct well the variation of chromatic aberration, which is a cause of deteriorating the image forming performance when a close object is photographed.

Therefore, in many telephoto lenses of the inner focusing type, the focusing lens unit is composed of at least one positive lens and at least one negative lens so as to correct residual chromatic aberration caused by the front lens unit and the variation of chromatic aberration caused by the focusing lens unit itself during focusing.

However, the conventional focusing lens unit is too heavy in weight to perform a higher-speed automatic focusing operation.

BRIEF SUMMARY OF THE INVENTION

It is a main object of the invention to provide an optical system having a focusing lens unit which is light in weight, and it is another object of the invention to provide an optical system capable of correcting well chromatic aberration and other aberrations and the variation of the various aberrations occurring during focusing, and, in particular, being optimum for an automatic focusing camera and having a high optical performance.

To attain the above objects, in accordance with an aspect of the invention, there is provided an optical system comprising, in order from an object side to an image side, a first lens unit of positive optical power, and a second lens unit of negative refractive power, wherein focusing from an infinitely distant object to a closest object is effected by moving the second lens unit toward the image side along an optical axis, and the second lens unit consists of one negative lens.

In the optical system in accordance with the aspect of the invention, it is desirable that the following conditions are satisfied:

$$d^2 L_1(\lambda)/d \lambda^2 > 0 \quad (1)$$

$$d^2 T_1(\lambda)/d \lambda^2 < 0 \quad (2)$$

$$\nu_2 > 30 \quad (3)$$

where $L_1(\lambda)$ is an aberration coefficient of longitudinal chromatic aberration of the first lens unit, $T_1(\lambda)$ is an aberration coefficient of lateral chromatic aberration of the first lens unit, $\lambda$ is a wavelength of light, and $v_2$ is an Abbe number of material of the negative lens of the second lens unit, being a $v_d$ value expressed by "$v_2 = (N_d - 1)/(N_F - N_C)$" where $N_d$, $N_F$ and $N_C$ are refractive indices with respect to d line, F line and C line, respectively.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 7A to 7D are aberration diagrams showing various aberrations occurring in the photographic lens according to the numerical example 1 when focusing is performed on an infinitely distant object.

FIGS. 8A to 8D are aberration diagrams showing various aberrations occurring in the photographic lens according to the numerical example 1 when focusing is performed on an object of the object distance of 3.5 m (when the unit of data of numerical examples is mm).

DETAILED DESCRIPTION OF THE INVENTION

Hereinafter, preferred embodiments of the invention will be described in detail with reference to the drawings.

Figure 1:
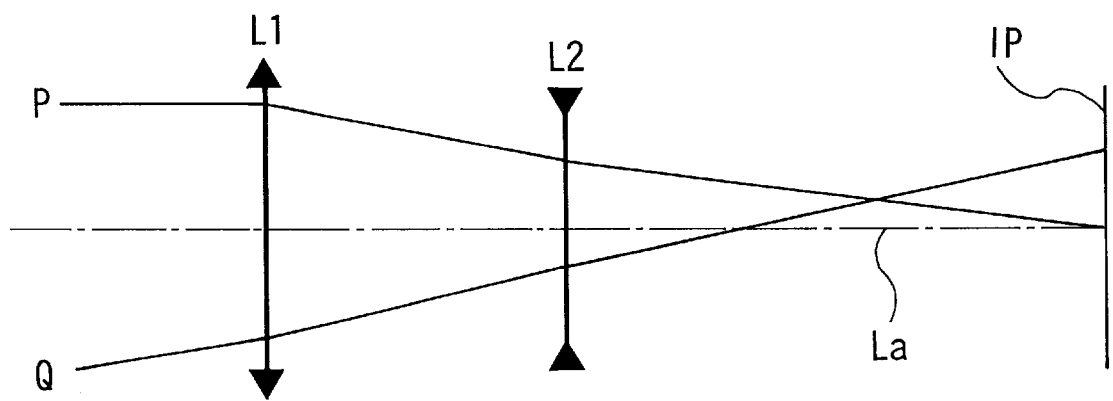
FIG. 1 a schematic diagram of the paraxial power arrangement of an optical system for the purpose of explaining the action of the invention.

FIG. 1 is a schematic diagram of an optical system according to the invention, which is applied to a telephoto lens, and shows the paraxial power arrangement for explaining the action in a reference state (the state obtained when focusing is performed on an infinitely distant object) when the inner focusing method (rear focusing method) is adopted in the telephoto lens.

In FIG. 1, L1 denotes a first lens unit having a positive optical power (the optical power being a reciprocal number of the focal length), L2 denotes a second lens unit having a negative optical power and arranged to move for focusing. The second lens unit L2 is composed of a single lens. IP denotes an image plane. P denotes a paraxial on-axial ray, and Q denotes a pupil paraxial ray. The height from an optical axis La at which the paraxial on-axial ray P passes through the second lens unit has a positive value, and the height from the optical axis La at which the pupil paraxial ray Q passes through the second lens unit has a negative value.

Figure 2A:
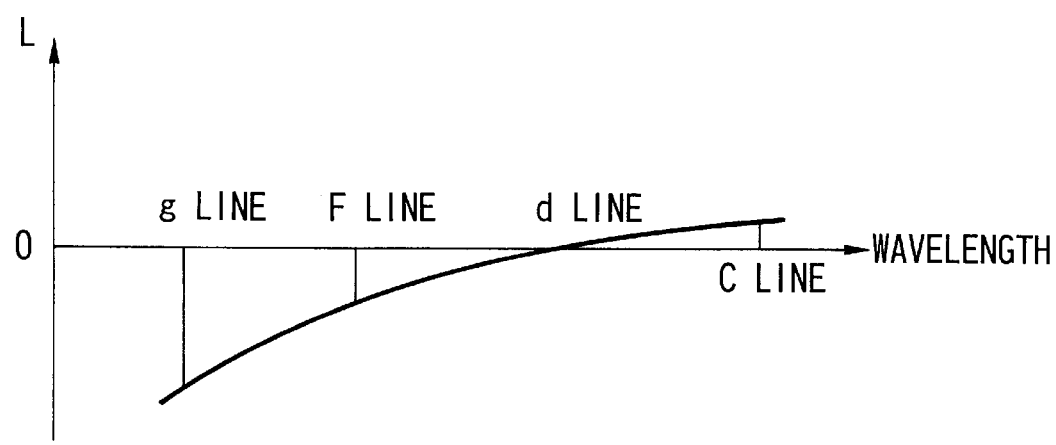
FIGS. 2A and 2B are conceptual diagrams for explaining the wavelength-dependency of an aberration coefficient of longitudinal chromatic aberration and that of an aberration coefficient of lateral chromatic aberration, respectively, of a second lens unit in the model shown in FIG. 1.
Figure 2B:
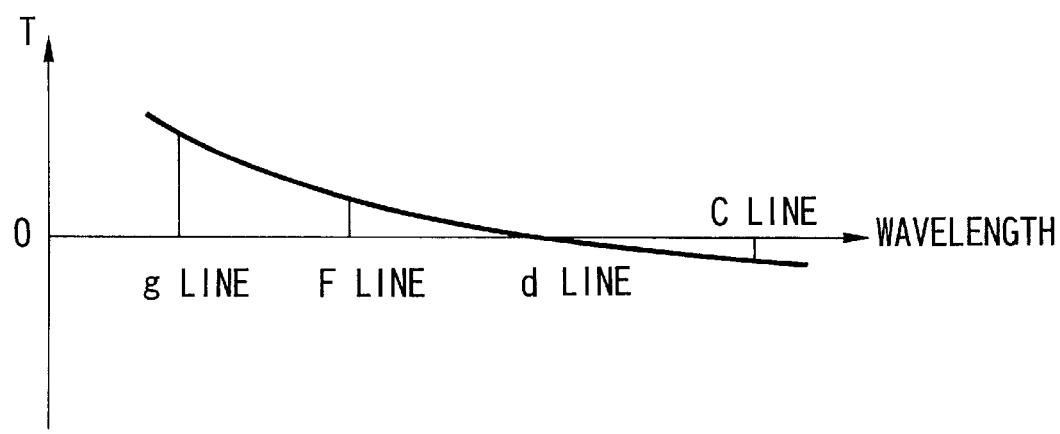

FIGS. 2A and 2B are conceptual diagrams for explaining the wavelength-dependency of an aberration coefficient of longitudinal chromatic aberration and that of an aberration coefficient of lateral chromatic aberration, respectively, of the second lens unit in the model shown in FIG. 1. The range of wavelength is set to a visible spectrum from g line (435.8 nm in wavelength) to C line (656.3 nm in wavelength), and the reference wavelength is set to d line (587.6 nm in wavelength).

Figure 3:
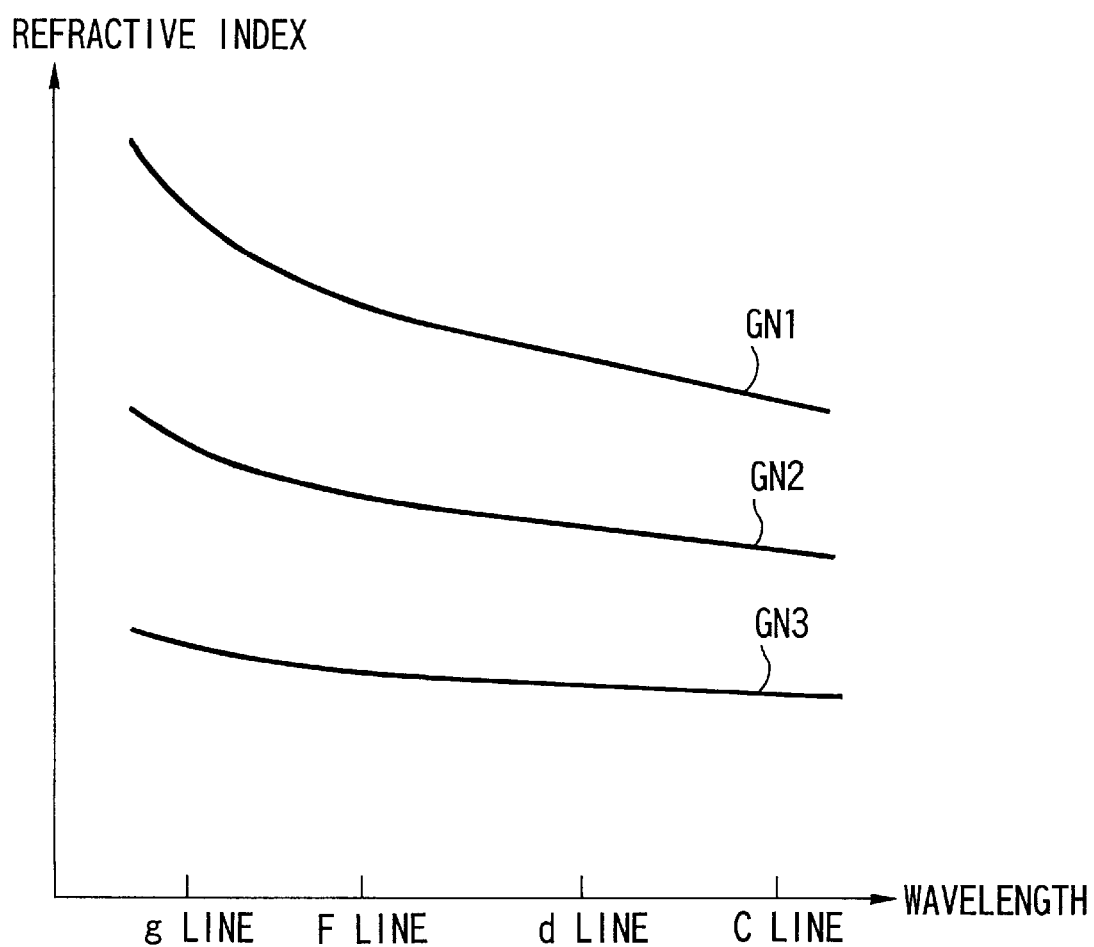
FIG. 3 is a schematic diagram for explaining the wavelength-dependency of refractive indices of optical glass materials.

FIG. 3 is a diagram showing dispersion curves of optical glass materials. In FIG. 3, a curve GN1 indicates the wavelength-dependency of the refractive index of a glass material of relatively high refractive index (generally having a high dispersion tendency, such as LaSF system, SF system, etc.), a curve GN3 indicates the wavelength-dependency of the refractive index of a glass material of relatively low refractive index (generally having a low dispersion tendency, such as BK system, FK system, etc.), and a curve GN2 indicates the wavelength-dependency of the refractive index of a glass material of middle refractive index between them.

First, since the height from the optical axis at which the paraxial on-axial ray P passes through the second lens unit has a positive value, the aberration coefficient of longitudinal chromatic aberration of the second lens unit, which is composed of a single lens made from a glass material having a negative optical power in the model shown in FIG. 1, has a negative value on the short wavelength side and a positive value on the long wavelength side, indicating such a tendency as to rise to the right as a whole. Further, a change of the aberration coefficient relative to the wavelength, because of the second lens unit being composed of a single lens, receives, as it is, an influence of such curving of refractive index of the single lens as shown in FIG. 3, so that the two-times differentiation of the aberration coefficient of longitudinal chromatic aberration with respect to the wavelength becomes a negative value, thereby indicating a curve convex upward (see FIG. 2A).

Then, since the height from the optical axis at which the pupil paraxial ray Q passes through the second lens unit has a negative value, the aberration coefficient of lateral chromatic aberration of the second lens unit has a positive value on the short wavelength side and a negative value on the long wavelength side, indicating such a tendency as to rise to the left as a whole. Further, a change of the aberration coefficient relative to the wavelength receives, as it is, an influence of the curving of refractive index of the single lens in the same manner as described above, so that the two-times differentiation of the aberration coefficient of lateral chromatic aberration with respect to the wavelength becomes a positive value, in the way reverse to the case of the aberration coefficient of longitudinal chromatic aberration, thereby indicating a downward convex curve (see FIG. 2B).

Next, an aberration coefficient curve of chromatic aberration of the first lens unit will be considered. First, if the whole of the first lens unit is regarded as a single lens, an Abbe number $v_1$ (equivalent Abbe number) thereof becomes:

$$\phi_1/v_1 = \sum_{i=1}^{n} \phi_{1i}/v_{1i}$$

where $\phi_1$ is an optical power of the entirety of the first lens unit, $\phi_{1i}$ is an optical power of the i-th thin single lens of the first lens unit, and $v_{1i}$ is an Abbe number of material of the i-th thin single lens of the first lens unit.

Since, in many cases, the first lens unit essentially has a positive optical power, the value of the right side of the above equation becomes a positive value, so that the sign of the equivalent Abbe number $v_1$ is allowed to be considered positive.

In this instance, in the model shown in FIG. 1, since the height from the optical axis at which the paraxial on-axial ray P passes through the first lens unit has a positive value, the aberration coefficient curve of longitudinal chromatic aberration of the first lens unit has a positive value on the short wavelength side and a negative value on the long wavelength side, thereby indicating such a tendency as to rise to the left as a whole. Further, since the height from the optical axis at which the pupil paraxial ray Q passes through the first lens unit has a negative value, the aberration coefficient curve of lateral chromatic aberration of the first lens unit has a negative value on the short wavelength side and a positive value on the long wavelength side, thereby indicating such a tendency as to rise to the right as a whole.

Accordingly, in order to cancel chromatic aberration by giving the aberration coefficients of the first lens unit a tendency opposite to the aberration coefficient curves of the second lens unit, since the whole inclinations of the aberration coefficient curves of the first lens unit and the second lens unit have such directions as to cancel each other, it is necessary that the curving of the aberration coefficient curves of the first lens unit is set to the direction opposite to the curving of the aberration coefficient curves of the second lens unit.

In other words, it is necessary that the aberration coefficient curve of longitudinal chromatic aberration of the first lens unit is set to be a curve having a downward convex curving and the aberration coefficient curve of lateral chromatic aberration thereof is set to be a curve having upward convex curving. This simply means that the above-mentioned conditions (1) and (2) are satisfied.

The above-mentioned condition (3) is concerned with an Abbe number of material of the single lens of negative optical power of the second lens unit, and aims at improving chromatic aberrations and other aberrations including the variation thereof due to focusing.

When the Abbe number becomes small beyond the lower limit of the condition (3), the whole inclinations of the aberration coefficient curves of longitudinal chromatic aberration and lateral chromatic aberration of the second lens unit are strengthened and, at the same time, the material of the single lens of the second lens unit has no choice but to be selected from among glass materials of relatively high refractive index having relatively large curving of refractive index relative to the variation of wavelength in view of the existing range of available glass materials. For this reason, the curving of the aberration coefficient curves of longitudinal chromatic aberration and lateral chromatic aberration, too, is strengthened. If the inclinations and curving of the whole aberration coefficient curves of chromatic aberration of the first lens unit is strengthened in such a way as to cancel the inclinations and curving of the whole aberration coefficient curves of chromatic aberration of the second lens unit, it disadvantageously becomes impossible to correct spherical aberration, coma, astigmatism, etc., in a well-balanced manner.

Further, because the first lens unit and the second lens unit are made to cancel each other with the large absolute values of the respective aberration coefficients, the variation of chromatic aberration of the first lens unit with respect to the movement of an object point becomes large and, at the same time, the variation of chromatic aberration of the second lens unit due to focusing also becomes large, thereby disadvantageously lowering the image forming performance greatly at the time of photo-taking of a near-distance object.

Preferably, it is desirable to make the condition (3) have the following numerical range, so that it becomes possible to further improve the image forming performance including the variation of chromatic aberration due to focusing.

$$v_2 > 60 \tag{3}'$$

In order to obtain better image forming performance in the present embodiment of the invention, it is preferred that, in addition to satisfying the above-mentioned conditions (1), (2) and (3) or in place of the conditions (1), (2) and (3), the first lens unit have the following construction.

That is, the first lens unit is composed of at least one diffractive surface of positive optical power constructed with a diffraction grating of rotational symmetry with respect to the optical axis, at least one positive lens, and at least one negative lens, and satisfies the following conditions:

$$0.005 < \phi_D/\phi < 0.1 \tag{4}$$

$$50 < v_{1P} < 96 \tag{5}$$

$$25 < v_{1N} < 60 \tag{6}$$

where $\phi_D$ is an optical power of the diffractive surface of positive optical power included in the first lens unit, with respect to diffracted light of a design diffraction order in a design wavelength, $\phi$ is an optical power of the entire optical system in the design wavelength, $v_{1P}$ is an average value of Abbe numbers ($v_D$ values) of materials of positive lenses included in the first lens unit, and $v_{1N}$ is an average value of Abbe numbers ($v_D$ values) of materials of negative lenses included in the first lens unit.

Figure 4:
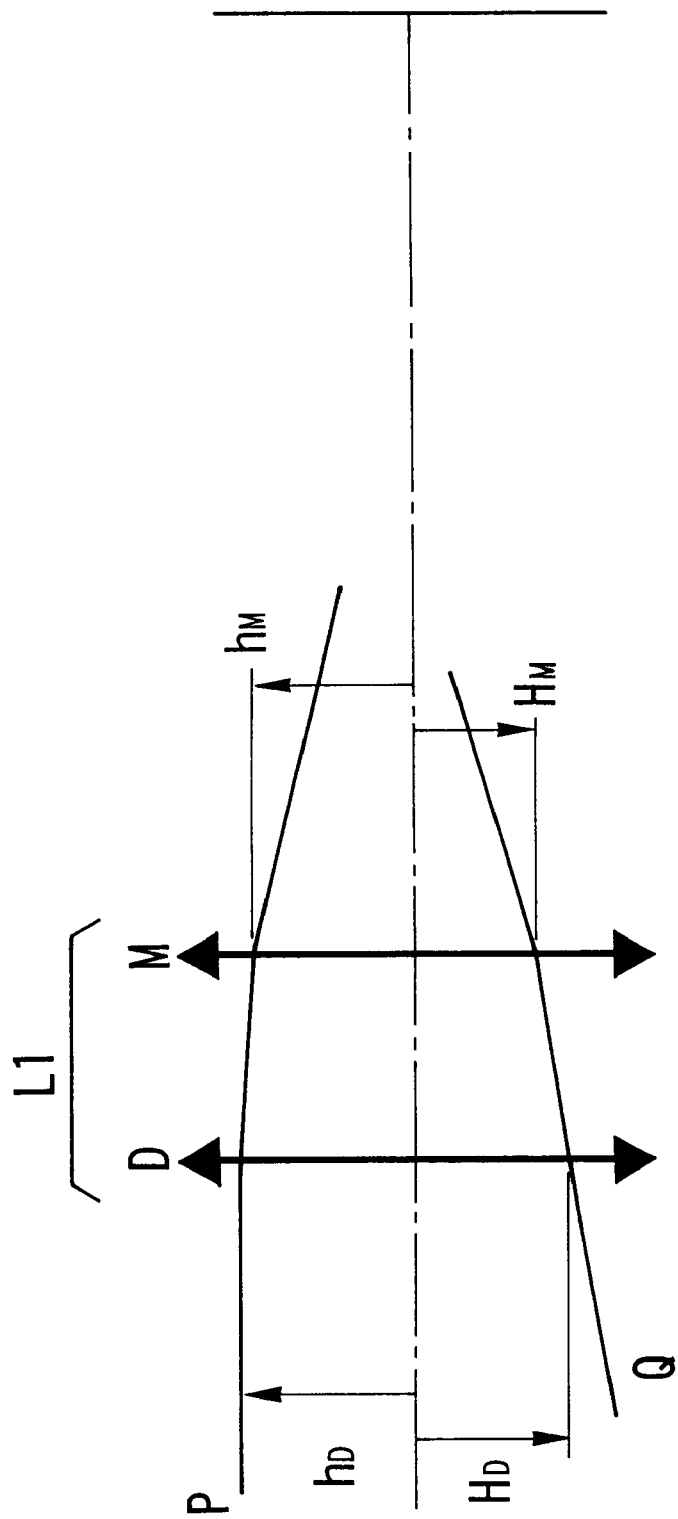
FIG. 4 is a schematic diagram of the paraxial power arrangement of the optical system for the purpose of explaining the action of a diffractive surface disposed in a first lens unit.

First, the action of the diffractive surface will be described. FIG. 4 is a schematic diagram showing the paraxial power arrangement for the purpose of explaining the action of the diffractive surface disposed in the first lens unit L1 in the construction shown in FIG. 1. In FIG. 4, M denotes a refractive optical system part, and D denotes the diffractive surface, the refractive optical system part M and the diffractive surface D constituting the first lens unit L1. P denotes a paraxial on-axial ray, and Q denotes a pupil paraxial ray. (Here, for simplification of the description, it is assumed that the diffractive surface D is disposed on the object side of the refractive optical system part M, the refractive optical system part M is composed of n thin lenses, and the refractive optical system part M itself is a thin system.)

First, the equations of an aberration coefficient $L_1$ of longitudinal chromatic aberration and an aberration coefficient $T_1$ of lateral chromatic aberration of the first lens unit with respect to an arbitrary wavelength $\lambda$ of light are taken as follows:

$$L_1(\lambda) = h_D^2 \phi_D / v_D(\lambda) + h_M^2 \sum_{i=1}^{n} \phi_{Mi} / v_{Mi}(\lambda) \tag{a}$$

$$T_1(\lambda) = h_D H_D \phi_D / v_D(\lambda) + h_M H_M \sum_{i=1}^{n} \phi_{Mi} / v_{Mi}(\lambda) \tag{b}$$

where $\phi_D$ is an optical power of the diffractive surface D with respect to diffracted light of a design diffraction order in a design wavelength, $\phi_{Mi}$ is an optical power of the i-th thin single lens of the refractive optical system part M in the design wavelength, $h_D$ is the height of a paraxial on-axial ray incident on the diffractive surface D, $h_M$ is the height of a paraxial on-axial ray incident on the refractive optical system part M, $H_D$ is the height of a pupil paraxial ray incident on the diffractive surface D, $H_M$ is the height of a pupil paraxial ray incident on the refractive optical system part M, $v_{Mi}(\lambda)$ is an Abbe number of material of the i-th thin single lens of the refractive optical system part M and is expressed by the following equation:

$$v_{Mi}(\lambda) = (N_{Mi}(\lambda_0) - 1)/(N_{Mi}(\lambda) - N_{Mi}(\lambda)) \tag{c}$$

where $N_{Mi}(\lambda)$ is a refractive index of the i-th thin single lens of the refractive optical system part M, and $\lambda_0$ is a design wavelength of the optical system, and $v_D(\lambda)$ is a reduced Abbe number of the diffractive surface D with respect to diffracted light of the design diffraction order according to the Ultrahigh-Index Method by W. C. Sweatt and is expressed by the following equation:

$$v_D(\lambda) = \lambda_0/(\lambda - \lambda_0) \tag{d}$$

If the equations (a) and (b) are rewritten by using the equations (c) and (d), the following equations are obtained:

$$L_1(\lambda) = \tag{a}'$$
$$h_D^2 \phi_D [\lambda - \lambda_0]/\lambda_0 + h_M^2 \sum_{i=1}^{n} \phi_{Mi}[N_{Mi}(\lambda) - N_{Mi}(\lambda_0)]/(N_{Mi}(\lambda_0) - 1)$$

$$T_1(\lambda) = h_D H_D \phi_D [\lambda - \lambda_0]/\lambda_0 + \tag{b}'$$
$$h_M H_M \sum_{i=1}^{n} \phi_{Mi}[N_{Mi}(\lambda) - N_{Mi}(\lambda_0)]/(N_{Mi}(\lambda_0) - 1)$$

If the equations (a)' and (b)" are differentiated with respect to $\lambda$, the following equations are obtained:

$$dL_1(\lambda)/d\lambda = h_D^2 \phi_D/\lambda_0 + h_M^2 \sum_{i=1}^{n} [\phi_{Mi}/(N_{Mi}(\lambda_0) - 1)][dN_{Mi}(\lambda)/d\lambda] \tag{a}''$$

$$dT_1(\lambda)/d\lambda = \tag{b}''$$
$$h_D H_D \phi_D/\lambda_0 + h_M H_M \sum_{i=1}^{n} [\phi_{Mi}/(N_{Mi}(\lambda_0) - 1)][dN_{Mi}(\lambda)/d\lambda]$$

Further, if the equations (a)" and (b)" are differentiated with respect to $\lambda$, the following equations are obtained:

$$d^2L_1(\lambda)/d\lambda^2 = h_M^2 \sum_{i=1}^{n} [\phi_{Mi}/(N_{Mi}(\lambda_0)-1)][d^2N_{Mi}(\lambda)/d\lambda^2] \quad (a)'''$$

$$d^2T_1(\lambda)/d\lambda^2 = h_M H_M \sum_{i=1}^{n} [\phi_{Mi}/(N_{Mi}(\lambda_0)-1)][d^2N_{Mi}(\lambda)/d\lambda^2] \quad (b)'''$$

As is understandable from the above equations (a)''' and (b)''', the value of the two-times differentiation of the aberration coefficient of each of longitudinal chromatic aberration and lateral chromatic aberration with respect to the wavelength depends on the construction of the refractive optical part system M, and the diffractive surface D does not directly contribute to that value. In other words, it is the refractive optical system part M that determines the curving of the aberration coefficient curve of chromatic aberration of the first lens unit, and in order to satisfy the above-mentioned conditions (1) and (2), i.e., $$d^2 L_1(\lambda)/d\lambda^2 > 0, \; d^2 T_1(\lambda)/d\lambda^2 < 0,$$

the following inequality has to be satisfied:

$$\sum_{i=1}^{n} [\phi_{Mi}/(N_{Mi}(\lambda_0)-1)][d^2N_{Mi}(\lambda)/d\lambda^2] > 0 \quad (e)$$

As is apparent also from the graph of FIG. 3 showing the wavelength-dependency of refractive indices of optical glass materials, the value of the two-times differentiation of the refractive index with respect to the wavelength in the inequality (e) is greater than "0", i.e., $d^2N_{Mi}(\lambda)/d\lambda^2 > 0$, and, further, $N_{Mi}(\lambda_0) - 1 > 0$.

Accordingly, if, among lenses constituting the refractive optical system part M of the first lens unit, a negative lens is given a weaker optical power and is made from a glass material in which "$d^2N_{Mi}(\lambda)/d\lambda^2$" is small and the curving of a refractive index is small (as a result, a glass material of relatively low refractive index and relatively low dispersion), and a positive lens is given a stronger optical power and is made from a glass material in which "$d^2N_{Mi}(\lambda)/d\lambda^2$" is large and the curving of a refractive index is large (as a result, a glass material of relatively high refractive index and relatively high dispersion), it is possible to bring the value of the condition (e) to a positive value.

However, if the first lens unit is composed only of the refractive optical system part M including three or so positive lenses and two or so negative lenses, as in the general telephoto lens, it is extremely difficult to cancel, by the first lens unit, the inclination and curving components of the whole aberration coefficient curves of longitudinal chromatic aberration and lateral chromatic aberration of the second lens unit.

More specifically, if, as is mentioned in the foregoing, in order to satisfy the condition (e), a negative lens is made from a glass material of relatively low refractive index (as a result, relatively low dispersion) and a positive lens is made from a glass material of relatively high refractive index (as a result, relatively high dispersion), the effect of such dispersion causes the inclination of the whole aberration coefficient curves of longitudinal chromatic aberration and lateral chromatic aberration of the first lens unit to become large.

As a result, the amount of occurrence of chromatic aberration of the first lens unit becomes large, so that chromatic aberration of the second lens unit is excessively corrected, thereby greatly deteriorating the chromatic aberration in the reference state of the entire optical system. Further, since the amount of variation of chromatic aberration of the first lens unit is greatly increased along with focusing on a near object, the chromatic aberration in focusing on a near object also becomes greatly deteriorated.

Figure 5A:
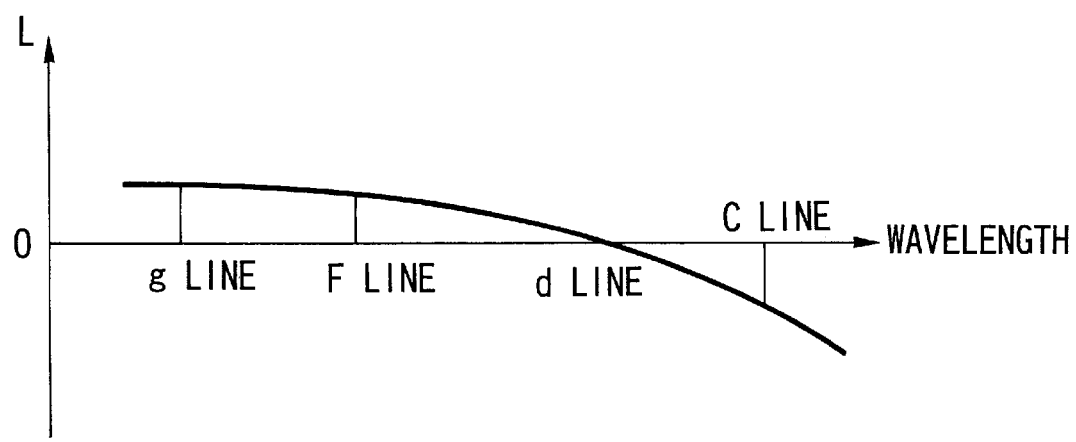
FIGS. 5A and 5B are conceptual diagrams for explaining the tendency of the wavelength-dependency of an aberration coefficient of longitudinal chromatic aberration and that of an aberration coefficient of lateral chromatic aberration, respectively, of a first lens unit in a conventional telephoto lens.
Figure 5B:
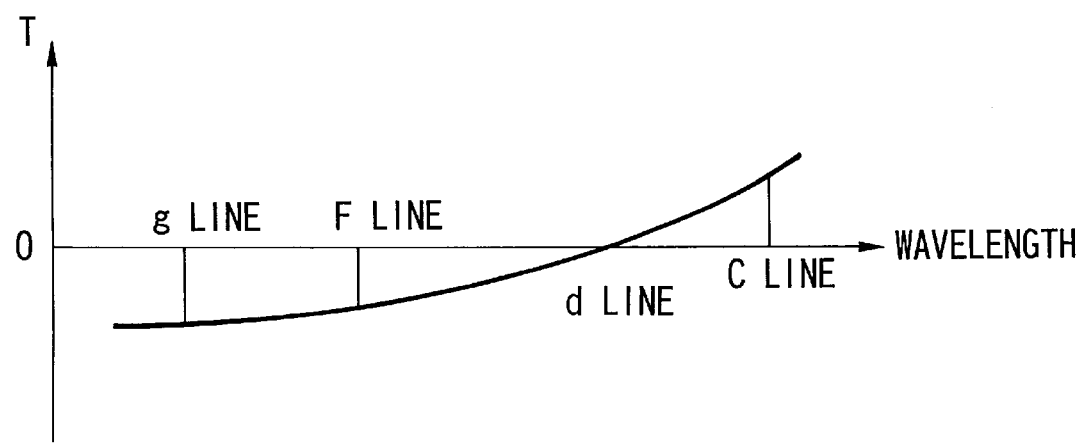

Conversely, if, as in the conventional telephoto lens, a negative lens is made from a glass material of relatively high refractive index (as a result, high low dispersion) and a positive lens is made from a glass material of relatively low refractive index (as a result, relatively low dispersion), although the amount of occurrence of chromatic aberration of the first lens unit becomes small, the direction of the curving of the aberration coefficient curves of longitudinal chromatic aberration and lateral chromatic aberration of the first lens unit becomes the same as the direction of the curving of those of the second lens unit due to the influence of the wavelength-dependency of refractive index (the curving of refractive index being strong) of a high-refractive-index glass material used mainly for the negative lens, so that it becomes impossible to sufficiently cancel chromatic aberration of the second lens unit (see FIGS. 5A and 5B).

Accordingly, if the first lens unit is constructed with only the refractive optical system part M, in view of the necessity of concurrently canceling the inclination and curving components of the whole aberration coefficient curves of longitudinal chromatic aberration and lateral chromatic aberration of the second lens unit by using only the refractive optical system part M, it is impossible to construct the refractive optical system part M with three or so positive lenses and two or so negative lenses, so that the refractive optical system part M has to have a considerably complicated construction.

However, if the diffractive surface D is provided in the first lens unit, it is possible to construct the refractive optical system part M with three or so positive lenses and two or so negative lenses. More specifically, as is understandable from the equations (a)'' and (b)'', only by changing the optical power of the diffractive surface D set forth in the first term of each equation, it is possible to relatively easily incline the aberration coefficient curves. Thus, it is only necessary that the refractive optical system part M controls almost only the curving of the aberration coefficient curves with regard to at least chromatic aberration.

In addition, the diffractive surface D is given such an effect as an aspheric surface by appropriately setting the pitch of marginal gratings relatively distant from the optical axis. Therefore, by regulating the optical power, refractive index and Abbe number of each constituent lens of the refractive optical system part M in satisfying the conditions (1) and (2), it is possible to sufficiently compensate for the slightly-lost freedom of correction of the various aberrations such as spherical aberration and coma by using the aspheric surface effect of the diffractive surface, and, at the same time, it is possible to sufficiently correct spherical aberration, coma, etc., which are deteriorated along with the shortening of the total lens length.

Accordingly, by providing the diffractive surface D in the first lens unit, it is possible to control almost the inclination of the whole aberration coefficient curves of longitudinal chromatic aberration and lateral chromatic aberration by means of the diffractive surface D. Further, since the freedom of correction of spherical aberration, coma, etc., is increased by the aspheric surface effect of the diffractive surface D, the aberration correction at the refractive optical system part M can be performed while giving priority to the control over the curving of the aberration coefficient curves of longitudinal chromatic aberration and lateral chromatic aberration. Therefore, while keeping the refractive optical system part M in a relatively simplified lens construction, it is possible to obtain a compact telephoto lens having a high optical performance and optimum for an automatic focusing operation.

The significance of each of the above-mentioned conditions (4), (5) and (6) will be described below. The condition (4) is concerned with the optical power of the diffractive surface D, and aims mainly at giving the necessary inclination to the whole aberration coefficient curves of longitudinal chromatic aberration and lateral chromatic aberration of the first lens unit so as to keep the good relation with the aberration curves of longitudinal chromatic aberration and lateral chromatic aberration of the second lens unit.

When the positive optical power $\phi_D$ is weakened beyond the lower limit of the condition (4), the inclination of the aberration coefficient curves (straight lines) of longitudinal chromatic aberration and lateral chromatic aberration of the diffractive surface D becomes weak. As a result, the inclination of the whole aberration coefficient curves of longitudinal chromatic aberration and lateral chromatic aberration of the first lens unit is strengthened, so that an excessive correction is disadvantageously performed on the longitudinal chromatic aberration and lateral chromatic aberration of the second lens unit.

In this instance, if the inclination of the whole aberration coefficient curves of longitudinal chromatic aberration and lateral chromatic aberration of the first lens unit is intended to be weakened by the refractive optical system part M, a negative lens, in particular, among lenses constituting the refractive optical system part M, has no choice but to be made from a glass material of relatively high dispersion (as a result, a glass material of relatively high refractive index). As a result, it disadvantageously becomes impossible to cancel the curving component of the aberration coefficient curves of longitudinal chromatic aberration and lateral chromatic aberration of the second lens unit.

Conversely, when the optical power $\phi_D$ is weakened beyond the upper limit of the condition (4), the inclination of the aberration coefficient curves (straight lines) of longitudinal chromatic aberration and lateral chromatic aberration of the diffractive surface D becomes strong. As a result, the inclination of the whole aberration coefficient curves of longitudinal chromatic aberration and lateral chromatic aberration of the first lens unit is weakened, so that an insufficient correction is disadvantageously performed on the longitudinal chromatic aberration and lateral chromatic aberration of the second lens unit.

In this instance, if the inclination of the whole aberration coefficient curves of longitudinal chromatic aberration and lateral chromatic aberration of the first lens unit is intended to be strengthened by the refractive optical system part M, it is advantageous to cancel the curving component of the aberration coefficient curves of longitudinal chromatic aberration and lateral chromatic aberration of the second lens unit. However, since the diffractive surface D and the refractive optical system part M have the respective large coefficients of chromatic aberration, the amount of variation of chromatic aberration of the first lens unit becomes large along with focusing on a near object, so that the chromatic aberration during focusing on a near object is greatly worsened.

The conditions (5) and (6) are concerned with the average values of Abbe numbers ($v_d$ values) of positive lenses and negative lenses, respectively, constituting the refractive optical system part M, and, similar to the condition (4), aim mainly at giving the necessary inclination to the whole aberration coefficient curves of longitudinal chromatic aberration and lateral chromatic aberration of the first lens unit so as to keep the good relation with the aberration curves of longitudinal chromatic aberration and lateral chromatic aberration of the second lens unit.

When the lower limit of the condition (5) or the upper limit of the condition (6) is exceeded, the inclination of the whole aberration coefficient curves of longitudinal chromatic aberration and lateral chromatic aberration of the first lens unit becomes weak. In particular, when the upper limit of the condition (6) is exceeded, there occurs the curving component having the same direction as that of the curving component of the aberration coefficient curves of longitudinal chromatic aberration and lateral chromatic aberration of the second lens unit. In order to correct such inclination and curving, as is mentioned in the foregoing, it is necessary to strengthen the optical power of a positive lens and, at the same time, weaken the optical power of a negative lens. At this time, a greatly insufficient correction is made on spherical aberration, and coma and astigmatism also become bad.

Conversely, When the upper limit of the condition (5) or the lower limit of the condition (6) is exceeded, the inclination of the whole aberration coefficient curves of longitudinal chromatic aberration and lateral chromatic aberration of the first lens unit becomes strong. In order to correct such inclination and curving, it is necessary to weaken the optical power of a positive lens and, at the same time, strengthen the optical power of a negative lens. At this time, a greatly excessive correction is made on spherical aberration, and coma and astigmatism also become bad.

Further, it is preferred to set the conditions (5) and (6) to the following numerical range:

$$55 < v_{1P} < 75 \tag{5}'$$

$$27 < v_{1N} < 50 \tag{6}'$$

In the present embodiments, in order to obtain the better image forming performance, it is preferred to satisfy the following condition, so that it is possible to further correct well the curving component of the aberration coefficient curves of longitudinal chromatic aberration and lateral chromatic aberration of the second lens unit:

$$\theta_{gF} < 0.61 \tag{7}$$

where $\theta_{gF}$ is a value obtained by averaging values of partial dispersion ratios "$(N_g-N_F)/(N_F-N_C)$" of negative lenses included in the first lens unit, where $N_g$, $N_F$ and $N_C$ are refractive indices of each negative lens with respect to g line, F line and C line, respectively.

When the limit of the condition (7) is exceeded, it disadvantageously becomes impossible to correct the curving component of the aberration coefficient curves of longitudinal chromatic aberration and lateral chromatic aberration of the second lens unit.

In addition, in the invention, it is preferred that the following condition is satisfied with regard to a negative lens disposed on the most object side among negative lenses included in the first lens unit, so that it is possible to further correct well the curving component of the aberration coefficient curves of longitudinal chromatic aberration and lateral chromatic aberration of the second lens unit:

$$\theta_{gF} < 0.591, \theta_{gd} < 1.3 \tag{8}$$

where $\theta_{gF}$ and $\theta_{gd}$ are partial dispersion ratios "$(N_g-N_F)/(N_F-N_C)$" and "$(N_g-N_d)/(N_F-N_C)$", respectively, where $N_g$, $N_F$, $N_d$ and $N_C$ are refractive indices of the negative lens disposed on the most object side among negative lenses included in the first lens unit with respect to g line, F line, d line and C line, respectively.

Next, the concrete lens construction of the photographic lens according to the present embodiments will be described.

Figure 6:
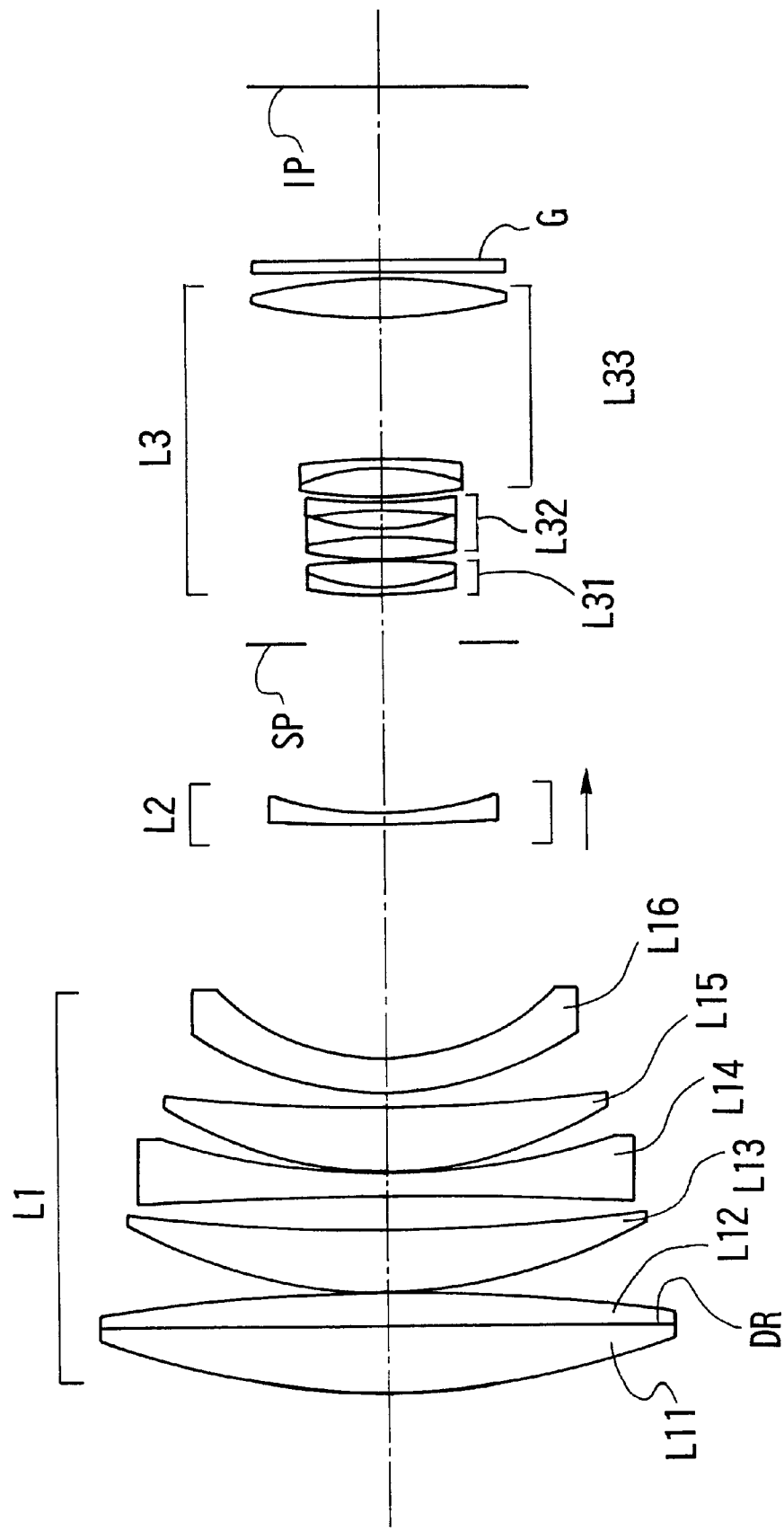
FIG. 6 is a lens sectional view of a photographic lens according to a numerical example 1.

FIG. 6 is a lens sectional view of a photographic lens according to a numerical example 1 of the invention when focusing is performed on an infinitely distant object. FIGS. 7A to 7D are aberration diagrams showing various aberrations occurring in the photographic lens according to the numerical example 1 when focusing is performed on an infinitely distant object. FIGS. 8A to 8D are aberration diagrams showing various aberrations occurring in the photographic lens according to the numerical example 1 when focusing is performed on an object of the object distance of 3.5 m (when the unit of data of numerical examples is mm).

Figure 9:
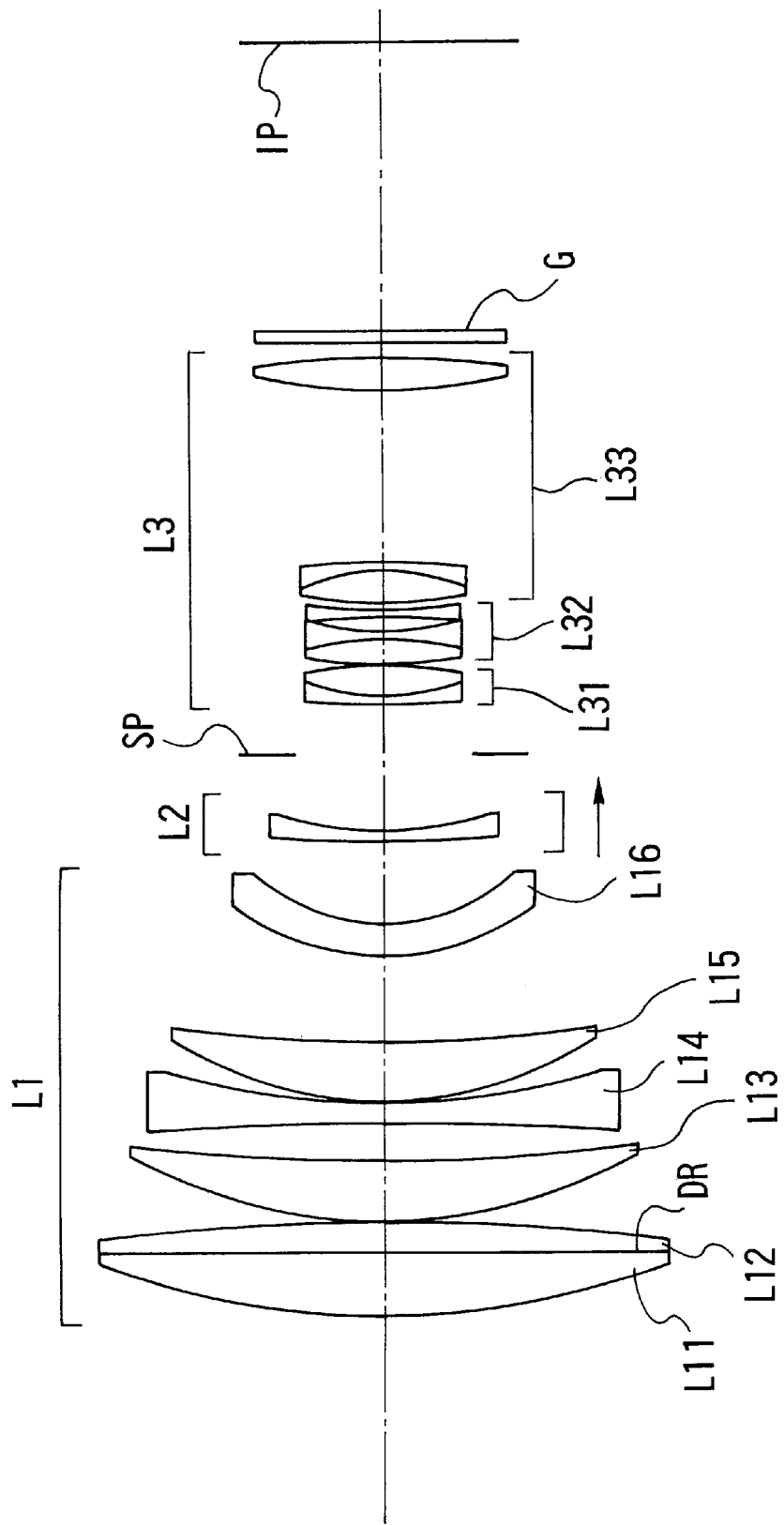
FIG. 9 is a lens sectional view of a photographic lens according to a numerical example 2.
Figures 10A, 10B, 10C, 10D:
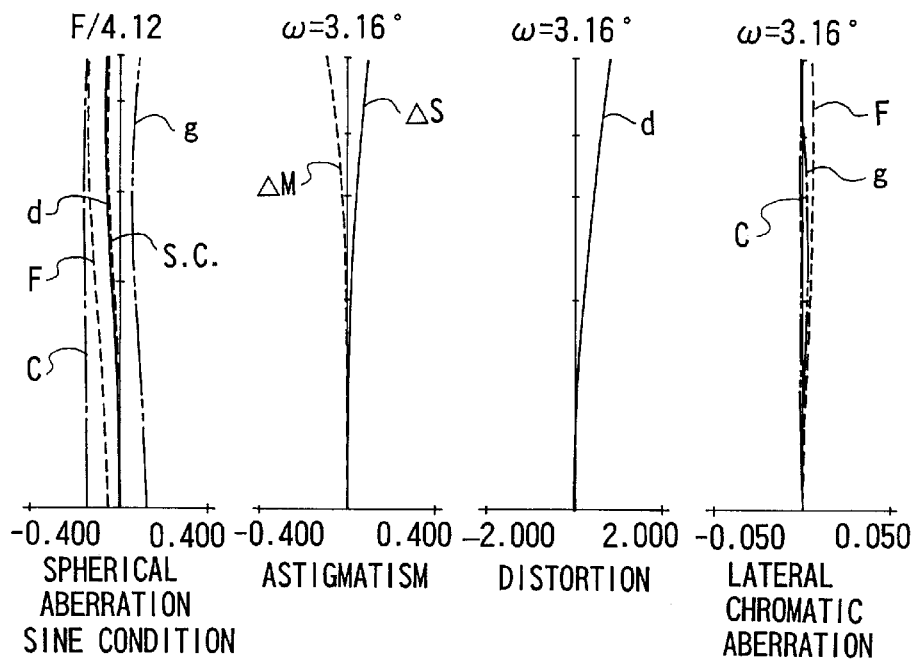
FIGS. 10A to 10D are aberration diagrams showing various aberrations occurring in the photographic lens according to the numerical example 2 when focusing is performed on an infinitely distant object.
Figures 11A, 11B, 11C, 11D:
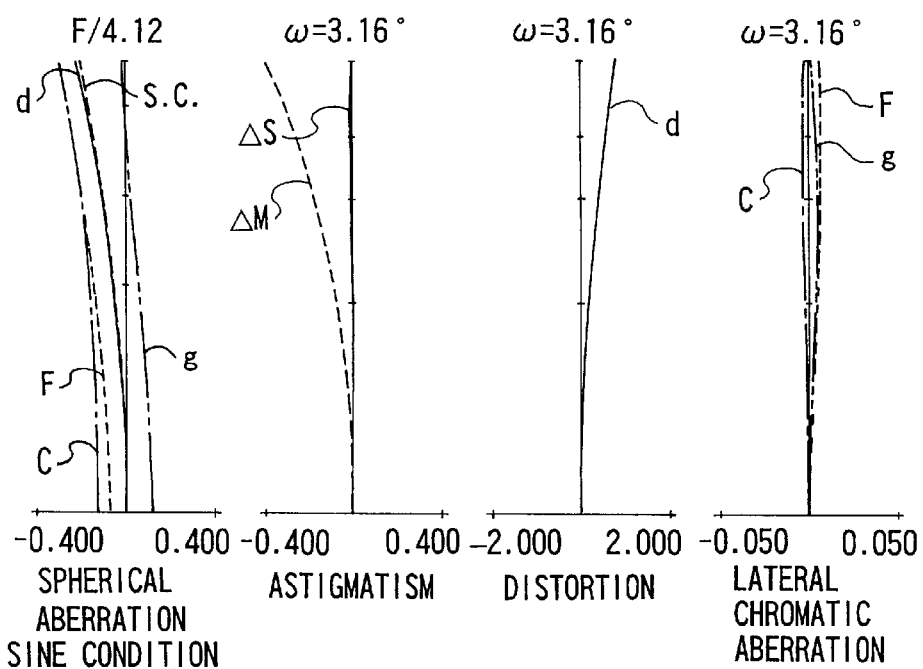
FIGS. 11A to 11D are aberration diagrams showing various aberrations occurring in the photographic lens according to the numerical example 2 when focusing is performed on an object of the object distance of 3.5 m (when the unit of data of numerical examples is mm).

FIG. 9 is a lens sectional view of a photographic lens according to a numerical example 2 of the invention when focusing is performed on an infinitely distant object. FIGS. 10A to 10D are aberration diagrams showing various aberrations occurring in the photographic lens according to the numerical example 2 when focusing is performed on an infinitely distant object. FIGS. 11A to 11D are aberration diagrams showing various aberrations occurring in the photographic lens according to the numerical example 2 when focusing is performed on an object of the object distance of 3.5 m (when the unit of data of numerical examples is mm).

Figure 12:
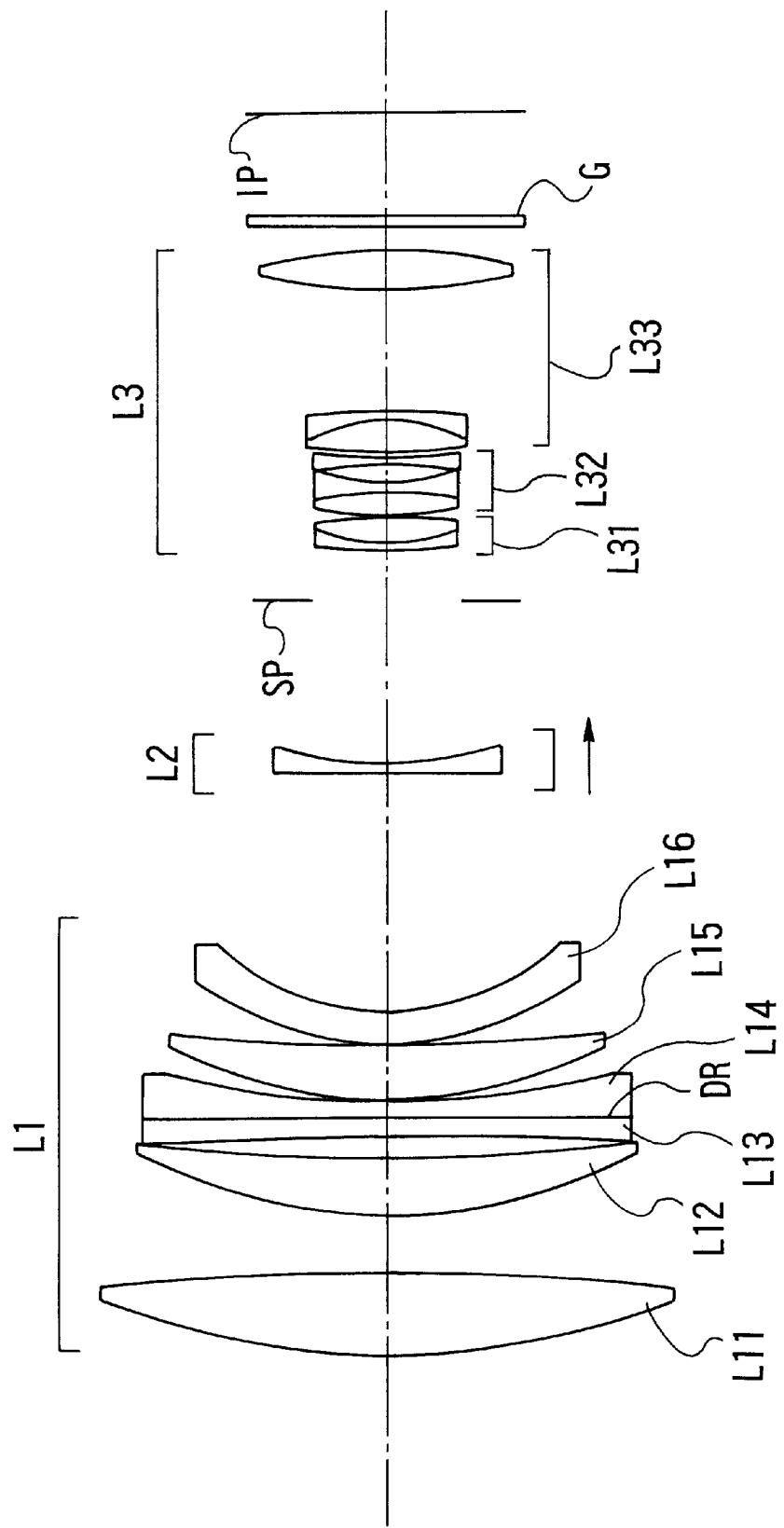
FIG. 12 is a lens sectional view of a photographic lens according to a numerical example 3.
Figures 13A, 13B, 13C, 13D:
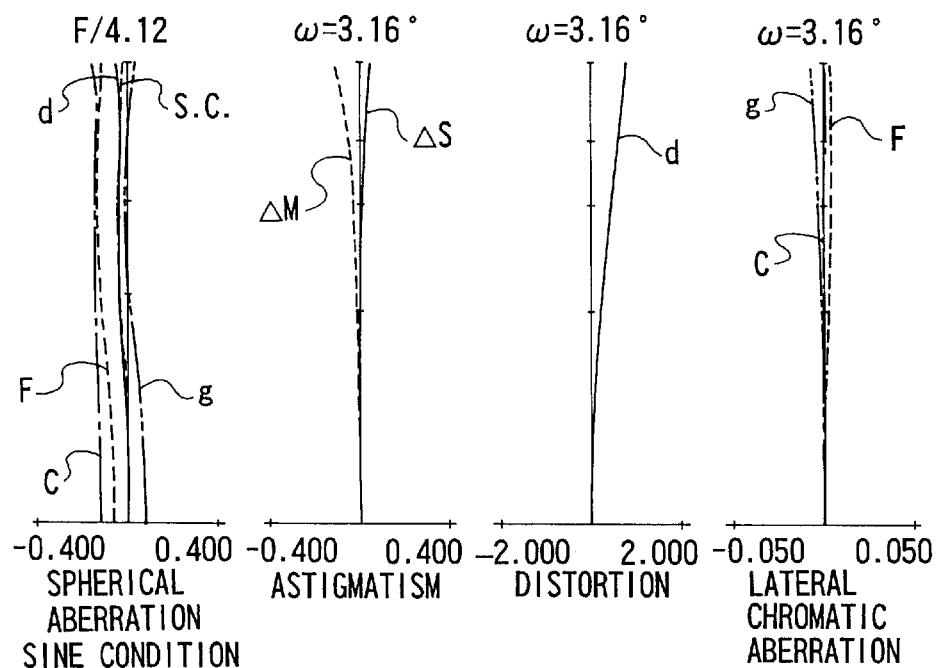
FIGS. 13A to 13D are aberration diagrams showing various aberrations occurring in the photographic lens according to the numerical example 3 when focusing is performed on an infinitely distant object.
Figures 14A, 14B, 14C, 14D:
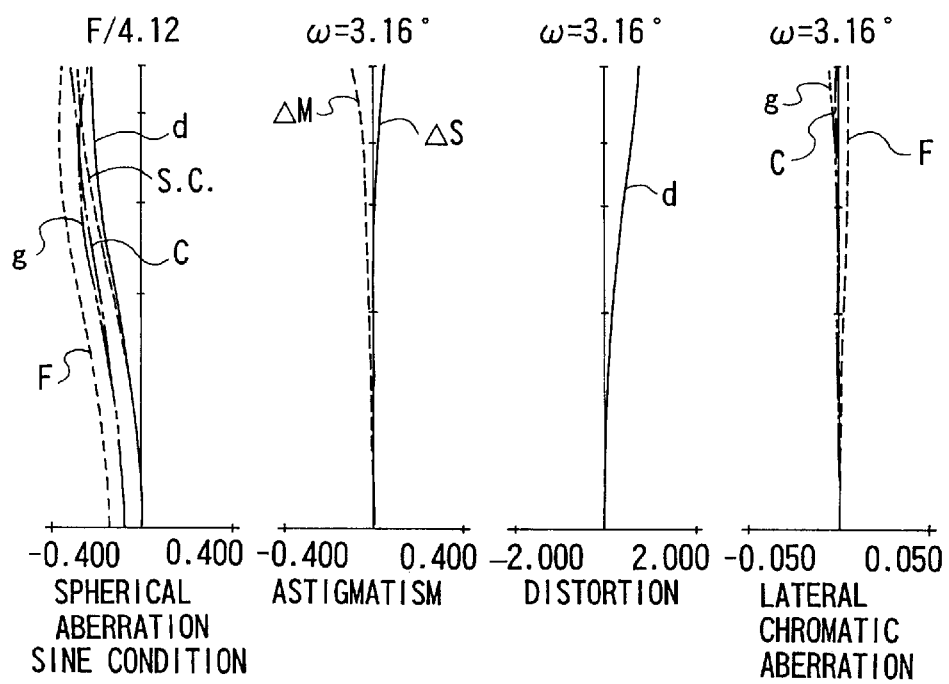
FIGS. 14A to 14D are aberration diagrams showing various aberrations occurring in the photographic lens according to the numerical example 3 when focusing is performed on an object of the object distance of 3.5 m (when the unit of data of numerical examples is mm).

FIG. 12 is a lens sectional view of a photographic lens according to a numerical example 3 of the invention when focusing is performed on an infinitely distant object. FIGS. 13A to 13D are aberration diagrams showing various aberrations occurring in the photographic lens according to the numerical example 3 when focusing is performed on an infinitely distant object. FIGS. 14A to 14D are aberration diagrams showing various aberrations occurring in the photographic lens according to the numerical example 3 when focusing is performed on an object of the object distance of 3.5 m (when the unit of data of numerical examples is mm).

Figure 15:
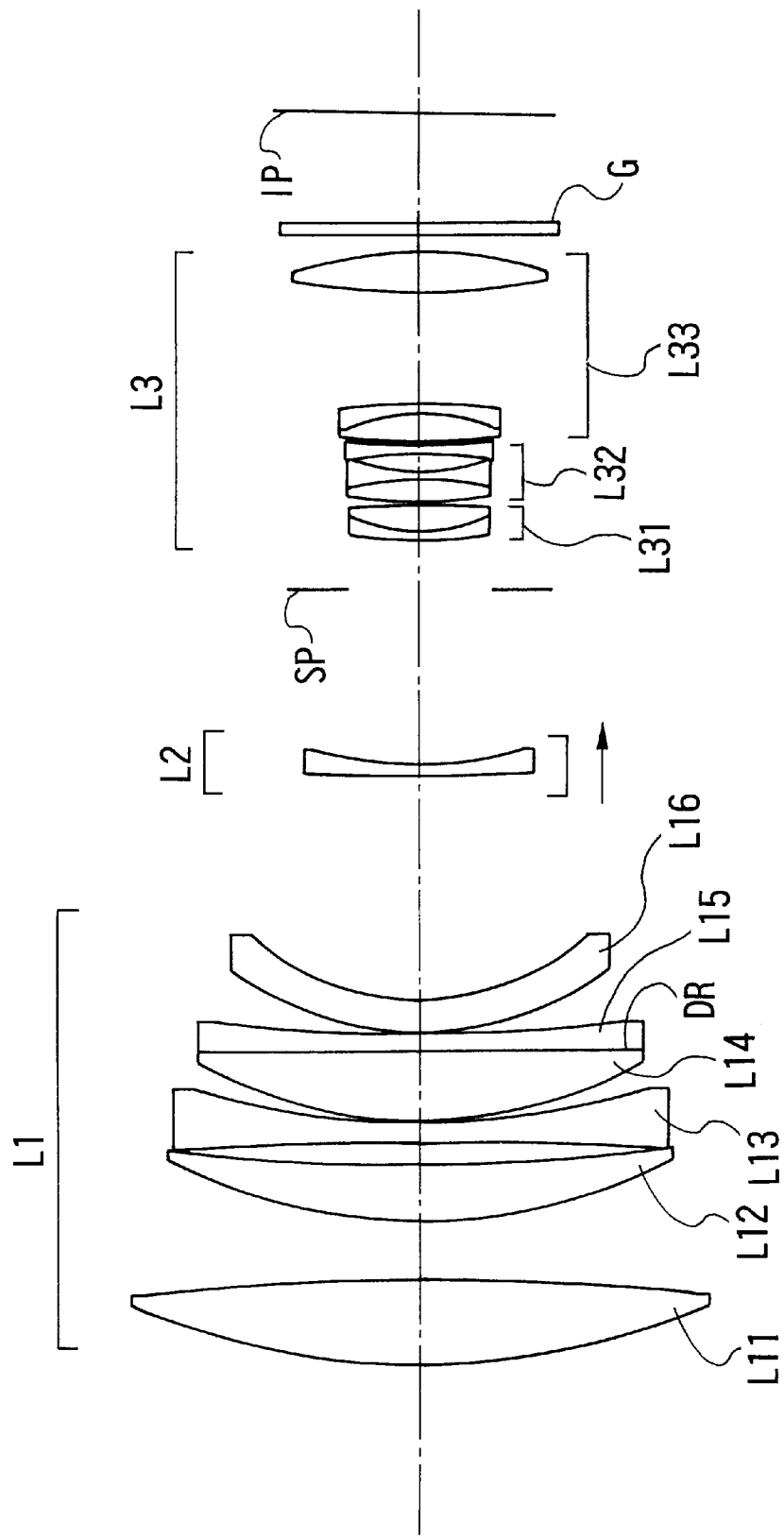
FIG. 15 is a lens sectional view of a photographic lens according to a numerical example 4.
Figures 16A, 16B, 16C, 16D:
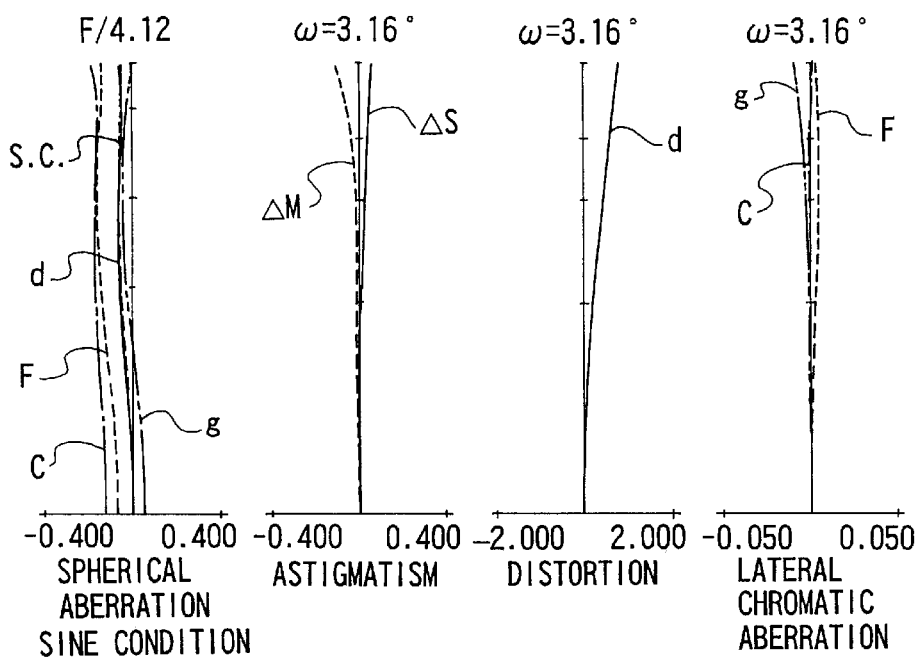
FIGS. 16A to 16D are aberration diagrams showing various aberrations occurring in the photographic lens according to the numerical example 4 when focusing is performed on an infinitely distant object.
Figures 17A, 17B, 17C, 17D:
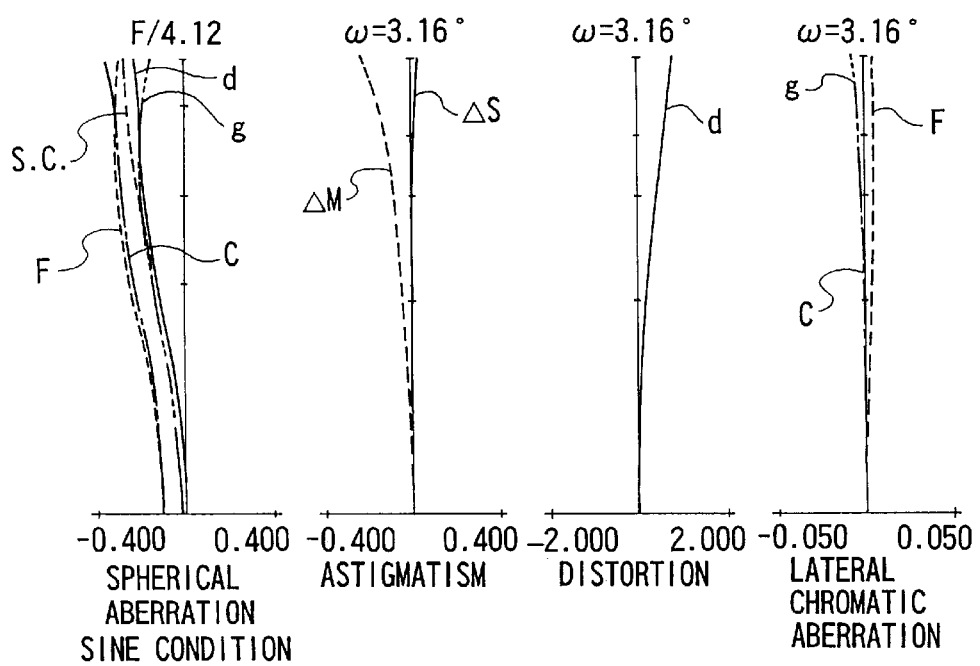
FIGS. 17A to 17D are aberration diagrams showing various aberrations occurring in the photographic lens according to the numerical example 4 when focusing is performed on an object of the object distance of 3.5 m (when the unit of data of numerical examples is mm).

FIG. 15 is a lens sectional view of a photographic lens according to a numerical example 4 of the invention when focusing is performed on an infinitely distant object. FIGS. 16A to 16D are aberration diagrams showing various aberrations occurring in the photographic lens according to the numerical example 4 when focusing is performed on an infinitely distant object. FIGS. 17A to 17D are aberration diagrams showing various aberrations occurring in the photographic lens according to the numerical example 4 when focusing is performed on an object of the object distance of 3.5 m (when the unit of data of numerical examples is mm).

In FIGS. 6, 9, 12 and 15, L1 denotes a first lens unit of positive optical power, L2 denotes a second lens unit of negative optical power, L3 denotes a third lens unit of positive or negative optical power, SP denotes a stop, and G denotes a glass block such as a filter or a face plate.

Focusing from an infinitely distant object to a closest object is performed by moving the second lens unit toward the image side along the optical axis, as indicated by the arrows, with a driving means (not shown) on the basis of a driving signal (focus detection signal) from an automatic focus detecting device (not shown) disposed in a camera body or the like, or with a manual operation.

In each of the numerical examples 1 and 2 shown in FIGS. 6 and 9, the first lens unit L1 is constructed with, in order from the object side to the image side, a cemented lens composed of a positive first lens L11 having a convex surface facing the object side and a positive second lens L12 having a convex surface facing the image side with a diffractive surface DR sandwiched therebetween, a positive third lens L13 of meniscus form having a convex surface facing the object side, a negative fourth lens L14 having a concave surface facing the image side, a positive fifth lens L15 having a convex surface facing the object side, and a negative sixth lens L16 of meniscus form having a convex surface facing the object side.

In the numerical example 3 shown in FIG. 12, the first lens unit L1 is constructed with, in order from the object side to the image side, a positive first lens L11 both lens surfaces of which are convex, a positive second lens L12 having a convex surface facing the object side, a cemented lens composed of a negative third lens L13 having a concave surface facing the object side and a negative fourth lens L14 having a concave surface facing the image side with a diffractive surface DR sandwiched therebetween, a positive fifth lens L15 of meniscus form having a convex surface facing the object side, and a negative sixth lens L16 of meniscus form having a convex surface facing the object side.

In the numerical example 4 shown in FIG. 15, the first lens unit L1 is constructed with, in order from the object side to the image side, a positive first lens L11 both lens surfaces of which are convex, a positive second lens L12 of meniscus form having a convex surface facing the object side, a negative third lens L13 both lens surfaces of which are concave, a cemented lens composed of a positive fourth lens L14 having a convex surface facing the object side and a negative fifth lens L15 having a concave surface facing the image side with a diffractive surface DR sandwiched therebetween, and a negative sixth lens L16 of meniscus form having a convex surface facing the object side.

In the present embodiments, the diffractive surface is provided in the first lens unit L1 so as to correct well the chromatic aberration (longitudinal chromatic aberration and lateral chromatic aberration) of the entire optical system.

In the lens construction of the first lens unit L1 in the present embodiments, the first two or three positive lenses are used to moderately converge a light flux so as to prevent occurrence of higher-order aberrations, and the subsequent negative lens is used to correct first-order aberration. Since, as mentioned above, aberration is corrected at such a stage that the height of incidence H of a ray of light in the first lens unit L1 is high, the effect of aberration correction is high, so that the variation of chromatic aberration is also effectively corrected.

Then, the subsequent positive lens is used to further converge a light flux, and the next negative lens of meniscus form is used to correct well inward coma and the variation of aberration due to the excessive tendency of a meridional image surface.

The second lens unit L2 consists of a single negative lens having a concave surface facing the image side. Such construction of the second lens unit L2 makes the focusing lens unit light in weight and makes rapid focusing easy.

The third lens unit L3 is constructed with, in order from the object side to the image side, a first lens subunit L31 consisting of a cemented lens composed of a negative lens of meniscus form having a convex surface facing the object side and a positive lens both lens surfaces of which are convex, a second lens subunit L32 consisting of a cemented lens composed of a positive lens both lens surfaces of which are convex and a negative lens both lens surfaces of which are con cave and a negative lens both lens surfaces of which are concave, and a third lens subunit L33 consisting of a cemented lens composed of a positive lens both lens surfaces of which are convex and a negative lens and a negative lens both lens surfaces of which are convex.

With the above lens construction employed, the various aberrations are corrected over the entire image plane.

Incidentally, the second lens subunit L32 of the third lens unit L3 is displaceable in the directions perpendicular to the optical axis so as to correct the position of an image on the image plane, that is, usable as an image-shake correcting lens unit.

Next, the numerical data of the numerical examples 1 to 4 is shown. In the numerical examples 1 to 4, ri represents the radius of curvature of the i-th surface, when counted from the object side, di represents the i-th on-axial surface interval, when counted from the object side, in the reference state (when focusing is performed on an infinitely distant object), ni and vi represent respectively the refractive index and Abbe number of material of the i-th optical member, when counted from the object side, with respect to d line, f represents the focal length, Fno represents the F-number, and 2ω represents the angle of view.

Further, the values of factors of the above-mentioned conditions in relation to the numerical examples 1 to 4 are listed in Table-1. In addition, the phase shape ψ of the diffractive surface in each of the numerical examples is expressed by the following equation:

$$\psi(h, m) = (2\pi/m\lambda_0)(C_1 h^2 + C_2 h^4 + C_3 h^6 \ldots)$$

where h is the height in the direction perpendicular to the optical axis, m is the diffraction order of diffracted light, $\lambda_0$ is a design wavelength, $C_i$ is a phase coefficient (i=1, 2, 3 . . . ).

Further, the optical power $\phi_D$ of the diffractive surface D with respect to an arbitrary wavelength λ and an arbitrary diffraction order m is expressed by the following equation by using the lowest-order phase coefficient $C_1$:

$$\phi_D(\lambda, m) = -2C_1 m\lambda/\lambda_0$$

Numerical Example 1

| f= 392.01852 | | Fno = 1:4.12 | 2ω = 6.32° |
|---|---|---|---|
| r 1 = 143.061 | d 1 = 10.66 | n 1 = 1.57405 | v 1 = 62.9 |
| r 2 = ∞ (*) | d 2 = 5.59 | n 2 = 1.48700 | v 2 = 70.4 |
| r 3 = -357.061 | d 3 = 0.35 | | |
| r 4 = 88.695 | d 4 = 10.81 | n 3 = 1.48700 | v 3 = 70.4 |
| r 5 = 342.682 | d 5 = 5.92 | | |
| r 6 = -757.906 | d 6 = 4.00 | n 4 = 1.71444 | v 4 = 44.3 |
| r 7 = 128.882 | d 7 = 0.30 | | |
| r 8 = 69.902 | d 8 = 11.14 | n 5 = 1.48700 | v 5 = 70.4 |
| r 9 = 324.721 | d 9 = 2.52 | | |
| r10 = 58.862 | d10 = 5.90 | n 6 = 1.65269 | v 6 = 31.6 |
| r11 = 41.561 | d11 = 40.08 | | |
| r12 = 765.494 | d12 = 1.80 | n 7 = 1.43387 | v 7 = 95.1 |
| r13 = 62.713 | d13 = 29.06 | | |
| r14 = Stop | d14 = 8.50 | | |
| r15 = 73.825 | d15 = 1.30 | n 8 = 1.86066 | v 8 = 26.7 |
| r16 = 32.351 | d16 = 4.72 | n 9 = 1.48700 | v 9 = 70.4 |
| r17 = -116.905 | d17 = 0.15 | | |
| r18 = 74.013 | d18 = 3.85 | n10 = 1.76616 | v10 = 27.2 |
| r19 = -70.625 | d19 = 1.30 | n11 = 1.78000 | v11 = 50.0 |
| r20 = 36.072 | d20 = 3.27 | | |
| r21 = -69.404 | d21 = 1.30 | n12 = 1.78000 | v12 = 50.00 |
| r22 = 92.900 | d22 = 1.03 | | |
| r23 = 84.383 | d23 = 4.98 | n13 = 1.62190 | v13 = 34.4 |
| r24 = -37.725 | d24 = 1.40 | n14 = 1.80048 | v14 = 47.7 |
| r25 = -135.682 | d25 = 23.90 | | |
| r26 = 92.168 | d26 = 6.68 | n15 = 1.50067 | v15 = 67.3 |
| r27 = -92.185 | d27 = 1.00 | | |
| r28 = ∞ | d28 = 2.00 | n16 = 1.51633 | v16 = 64.2 |
| r29 = ∞ | | | |

*: Diffractive Surface

Phase Coefficients of the Diffractive Surface

| C1 = -4.43870D-05 | C2 = 5.89910D-10 |
|---|---|
| C3 = -1.88130D-13 | C4 = 3.49910D-17 |

Numerical Example 2

| f = 391.92001 | | Fno = 1:4.12 | 2ω = 6.32° |
|---|---|---|---|
| r 1 = 139.355 | d 1 = 10.80 | n 1 = 1.68644 | v 1 = 55.0 |
| r 2 = ∞ (*) | d 2 = 5.34 | n 2 = 1.48700 | v 2 = 70.4 |
| r 3 = -386.973 | d 3 = 0.35 | | |
| r 4 = 88.208 | d 4 = 10.63 | n 3 = 1.48700 | v 3 = 70.4 |
| r 5 = 345.383 | d 5 = 6.10 | | |
| r 6 = -715.148 | d 6 = 3.80 | n 4 = 1.72401 | v 4 = 33.1 |
| r 7 = 129.822 | d 7 = 0.30 | | |
| r 8 = 66.014 | d 8 = 10.65 | n 5 = 1.48700 | v 5 = 70.4 |
| r 9 = 254.744 | d 9 = 14.96 | | |
| r10 = 43.284 | d10 = 5.50 | n 6 = 1.77130 | v 6 = 27.3 |
| r11 = 32.352 | d11 = 14.38 | | |
| r12 = 215.154 | d12 = 1.80 | n 7 = 1.43387 | v 7 = 95.1 |
| r13 = 59.304 | d13 = 13.31 | | |
| r14 = Stop | d14 = 8.71 | | |
| r15 = 225.007 | d15 = 1.30 | n 8 = 1.88500 | v 8 = 41.0 |
| r16 = 37.005 | d16 = 5.15 | n 9 = 1.48700 | v 9 = 70.4 |
| r17 = -77.098 | d17 = 0.15 | | |
| r18 = 73.675 | d18 = 4.44 | n10 = 1.79788 | v10 = 24.4 |
| r19 = -53.890 | d19 = 1.30 | n11 = 1.88500 | v11 = 41.0 |
| r20 = 41.585 | d20 = 2.75 | | |
| r21 = -132.852 | d21 = 1.30 | n12 = 1.88500 | v12 = 41.0 |
| r22 = 90.209 | d22 = 1.09 | | |
| r23 = 67.440 | d23 = 5.73 | n13 = 1.61282 | v13 = 35.4 |
| r24 = -33.050 | d24 = 1.40 | n14 = 1.88500 | v14 = 41.0 |
| r25 = -136.308 | d25 = 29.64 | | |
| r26 = 99.208 | d26 = 5.62 | n15 = 1.51857 | v15 = 54.4 |
| r27 = -147.386 | d27 = 2.50 | | |
| r28 = ∞ | d28 = 2.00 | n16 = 1.51633 | v16 = 64.2 |
| r29 = ∞ | | | |

*: Diffractive Surface

Phase Coefficients of the Diffractive Surface

| C1 = -5.41080D-05 | C2 = 2.03350D-09 |
|---|---|
| C3 = -2.90560D-13 | C4 = 3.77180D-17 |

Numerical Example 3

| f = 392.01666 | | Fno = 1:4.12 | 2ω = 6.32° |
|---|---|---|---|
| r 1 = 129.863 | d 1 = 14.46 | n 1 = 1.51812 | v 1 = 67.2 |
| r 2 = -457.003 | d 2 = 10.00 | | |
| r 3 = 91.306 | d 3 = 9.96 | n 2 = 1.48700 | v 2 = 70.4 |
| r 4 = 353.968 | d 4 = 3.57 | | |
| r 5 = -840.001 | d 5 = 3.30 | n 3 = 1.62097 | v 3 = 43.0 |
| r 6 = ∞ (*) | d 6 = 3.00 | n 4 = 1.77096 | v 4 = 39.9 |
| r 7 = 168.456 | d 7 = 0.30 | | |
| r 8 = 82.324 | d 8 = 9.23 | n 5 = 1.48700 | v 5 = 70.4 |
| r 9 = 345.491 | d 9 = 0.15 | | |
| r10 = 55.755 | d10 = 5.50 | n 6 = 1.64913 | v 6 = 32.1 |
| r11 = 43.097 | d11 = 41.08 | | |
| r12 = 884.107 | d12 = 2.00 | n 7 = 1.43387 | v 7 = 95.1 |
| r13 = 62.200 | d13 = 28.00 | | |
| r14 = Stop | d14 = 8.50 | | |
| r15 = 92.177 | d15 = 1.30 | n 8 = 1.85083 | v 8 = 23.3 |
| r16 = 31.966 | d16 = 4.76 | n 9 = 1.48700 | v 9 = 70.4 |
| r17 = -88.597 | d17 = 0.15 | | |
| r18 = 63.347 | d18 = 4.02 | n10 = 1.73942 | v10 = 26.6 |
| r19 = -64.149 | d19 = 1.30 | n11 = 1.78000 | v11 = 50.0 |
| r20 = 31.245 | d20 = 3.43 | | |
| r21 = -65.691 | d21 = 1.30 | n12 = 1.88500 | v12 = 41.0 |
| r22 = 151.587 | d22 = 0.68 | | |

-continued

| | | | |
|---|---|---|---|
| r23 = 100.980 | d23 = 5.56 | n13 = 1.65883 | v13 = 31.2 |
| r24 = −27.118 | d24 = 1.40 | n14 = 1.78000 | v14 = 50.0 |
| r25 = −139.425 | d25 = 20.73 | | |
| r26 = 92.274 | d26 = 6.82 | n15 = 1.56113 | v15 = 63.1 |
| r27 = −87.299 | d27 = 4.00 | | |
| r28 = ∞ | d28 = 2.00 | n16 = 1.51633 | v16 = 64.2 |
| r29 = ∞ | | | |

*: Diffractive Surface

Phase Coefficients of the Diffractive Surface

| | |
|---|---|
| C1 = −6.74630D-05 | C2 = 3.05490D-09 |
| C3 = −4.36020D-13 | |

-continued

| | | | |
|---|---|---|---|
| r22 = 144.632 | d22 = 0.50 | | |
| r23 = 102.072 | d23 = 5.01 | n13 = 1.65902 | v13 = 31.2 |
| r24 = −31.420 | d24 = 1.40 | n14 = 1.88500 | v14 = 41.0 |
| r25 = −121.572 | d25 = 18.85 | | |
| r26 = 108.422 | d26 = 7.17 | n15 = 1.58469 | v15 = 62.3 |
| r27 = −67.849 | d27 = 3.00 | | |
| r28 = ∞ | d28 = 2.00 | n16 = 1.51633 | v16 = 64.2 |
| r29 = ∞ | | | |

*: Diffractive Surface

Phase Coefficients of the Diffractive Surface

| | |
|---|---|
| C1 = −8.28340D-05 | C2 = 6.89480D-09 |
| C3 = −9.19500D-13 | |

TABLE 1

| | | Numerical Example | | | |
|---|---|---|---|---|---|
| Factor | | 1 | 2 | 3 | 4 |
| $\phi_D$ | | 8.8774E-05 | 1.0822E-04 | 1.3493E-04 | 1.6567E-04 |
| $\phi$ | | 2.5509E-03 | 2.5515E-03 | 2.5509E-03 | 2.5509E-03 |
| (1) | $\lambda$ = 480 nm | $2.5 \times 10^{-5}$ | $2.1 \times 10^{-5}$ | $2.6 \times 10^{-5}$ | $3.1 \times 10^{-5}$ |
| $^{dd/^{22}}LL_{11}((\lambda);d\lambda^{22}$ | | | | | |
| | $\lambda$ = 580 nm | $1.2 \times 10^{-5}$ | $1.1 \times 10^{-5}$ | $1.2 \times 10^{-5}$ | $1.4 \times 10^{-5}$ |
| | $\lambda$ = 650 nm | $7.3 \times 10^{-6}$ | $6.6 \times 10^{-6}$ | $7.4 \times 10^{-6}$ | $8.4 \times 10^{-6}$ |
| (2) | $\lambda$ = 480 nm | $-2.0 \times 10^{-5}$ | $-1.8 \times 10^{-7}$ | $-2.1 \times 10^{-5}$ | $-2.6 \times 10^{-5}$ |
| $^{dd/^{22}}TT_{11}((\lambda);d\lambda^{22}$ | | | | | |
| | $\lambda$ = 580 nm | $-1.1 \times 10^{-5}$ | $-1.9 \times 10^{-6}$ | $-1.1 \times 10^{-5}$ | $-1.3 \times 10^{-5}$ |
| | $\lambda$ = 650 nm | $-6.7 \times 10^{-6}$ | $-1.5 \times 10^{-6}$ | $-6.8 \times 10^{-6}$ | $-8.0 \times 10^{-6}$ |
| (3) v2 | | 95.10 | 95.10 | 95.10 | 95.10 |
| (4) $\phi_D/\phi$ | | 0.0348 | 0.0424 | 0.0529 | 0.0649 |
| (5) $v_{1P}$ | | 68.54 | 66.54 | 69.35 | 69.42 |
| (6) $v_{1N}$ | | 37.00 | 37.70 | 30.70 | 42.90 |
| (7) $\Theta_{gF}$ | | 0.581805 | 0.595714 | 0.581179 | 0.575248 |
| (8) | $\theta_{gF}$ | 0.570505 | 0.590563 | 0.572830 | 0.568503 |
| | $\theta_{gd}$ | 1.274007 | 1.299368 | 1.276946 | 1.271475 |

Numerical Example 4

| | | | |
|---|---|---|---|
| f = 392.01611 | Fno = 1:4.12 | 2ω = 6.32° | |
| r 1 = 127.789 | d 1 = 14.09 | n 1 = 1.51584 | v 1 = 67.5 |
| r 2 = −464.452 | d 2 = 10.00 | | |
| r 3 = 91.726 | d 3 = 9.70 | n 2 = 1.48700 | v 2 = 70.4 |
| r 4 = 333.812 | d 4 = 3.67 | | |
| r 5 = −852.657 | d 5 = 3.80 | n 3 = 1.63471 | v 3 = 45.5 |
| r 6 = 134.138 | d 6 = 0.30 | | |
| r 7 = 76.696 | d 7 = 11.95 | n 4 = 1.48700 | v 4 = 70.4 |
| r 8 = ∞ (*) | d 8 = 3.00 | n 5 = 1.52807 | v 5 = 51.2 |
| r 9 = 283.429 | d 9 = 0.15 | | |
| r10 = 53.244 | d10 = 5.50 | n 6 = 1.76765 | v 6 = 28.4 |
| r11 = 41.723 | d11 = 38.70 | | |
| r12 = 396.112 | d12 = 2.00 | n 7 = 1.43387 | v 7 = 95.1 |
| r13 = 62.569 | d13 = 30.04 | | |
| r14 = (stop) | d14 = 8.50 | | |
| r15 = 81.333 | d15 = 1.30 | n 8 = 1.85402 | v 8 = 24.3 |
| r16 = 26.492 | d16 = 4.71 | n 9 = 1.55767 | v 9 = 43.7 |
| r17 = −152.900 | d17 = 0.50 | | |
| r18 = 81.168 | d18 = 3.86 | n10 = 1.76265 | v10 = 25.7 |
| r19 = −55.013 | d19 = 1.30 | n11 = 1.83442 | v11 = 44.6 |
| r20 = 34.220 | d20 = 3.18 | | |
| r21 = −64.089 | d21 = 1.30 | n12 = 1.78000 | v12 = 50.0 |

In each of the numerical examples 1 to 4, the diffraction order m of diffracted light is the first order, and the design wavelength $\lambda_0$ is the wavelength of d line (587.56 nm).

In addition, while, in the numerical examples 1 to 4, there is provided one diffractive surface of positive optical power, an additional diffractive surface may be provided, so that the better optical performance can be obtained. The additional diffractive surface may be of positive optical power or of negative optical power. In particular, if a diffractive surface of negative optical power is additionally provided, it is preferred that the diffractive surface is disposed at such a position near the image plane as to make the height of incidence of a pupil paraxial ray relatively high and make the height of incidence of a paraxial on-axial ray relatively low.

By this, it is possible to further correct well lateral chromatic aberration. In addition, while the diffractive surface is provided on a plane surface part of a lens, it may be provided on the surface of a spherical lens or an aspherical lens., or on the two surfaces of a lens. Further, the diffractive surface may be provided on a cementing surface of a cemented lens, and the material serving as a base of the diffractive surface may be any material that transmits light, being not limited to glass.

In particular, it is preferred that the diffractive surface provided in the first lens unit is disposed on a plane surface, a lens surface convex toward the object side or a lens surface moderately concave toward the object side, in such a way as to make a ray of light from an on-axial object point or an off-axial object point perpendicularly incident on the diffractive surface, so that it is possible to mitigate the lowering of the diffraction efficiency.

Preferably, it is desirable that the diffractive surface is provided on such a lens surface that a ray of light is made incident on the normal line of the lens surface at an angle of ±15°.

Figure 18:
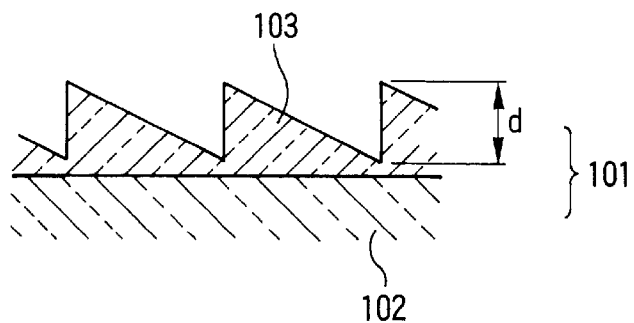
FIG. 18 is a sectional view for explaining a diffractive surface.
Figure 19:
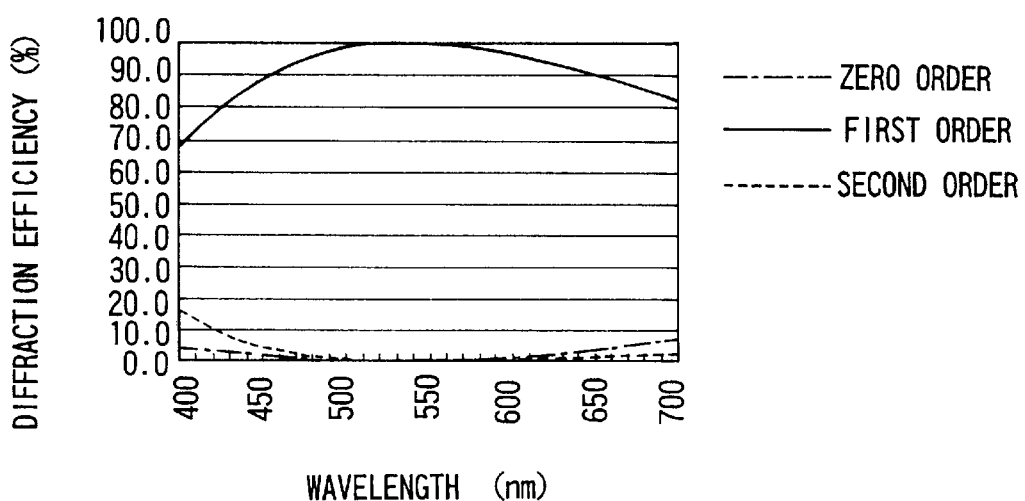
FIG. 19 is a diagram for explaining the wavelength-dependency characteristic of the diffractive surface shown in FIG. 18.

The diffraction grating shape of the diffractive surface in each of the numerical examples 1 to 4 is a kinoform such as that shown in FIG. 18. FIG. 19 shows the wavelength-dependent characteristic of the first-order diffraction efficiency in the diffractive surface shown in FIG. 18. In the actual structure of the diffraction grating, on the surface of a substrate 102 shown in FIG. 18, there is coated an ultraviolet curable polymer, at which a grating 103 of a grating thickness "d" is formed such that the first-order diffraction efficiency becomes 100% at the wavelength of 530 nm.

Figure 20:
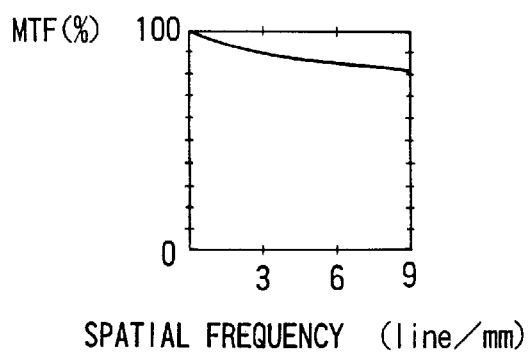
FIG. 20 is a diagram showing the MTF characteristic of the diffractive surface shown in FIG. 18.

As is apparent from FIG. 19, the diffraction efficiency in the design order is lowered accordingly as the wavelength moves away from the optimum wavelength of 530 nm, and, on the other hand, diffracted light of the zero order and the second order near the design order increases. Such an increase of diffracted light of orders other than the design order becomes flare, leading to the lowering of the resolution of an optical system. FIG. 20 shows the MTF (modulation transfer function) characteristic of the diffractive surface with respect to spatial frequency in a case where the diffractive surface is formed in the grating shape shown in FIG. 18. In FIG. 18, it is understood that the MTF in the low-frequency range is lowered from the desired value. Therefore, it is conceivable that, as another embodiment, a diffraction grating of the laminated type shown in FIG. 21 is applied to the grating shape of the diffractive surface in the photographic lens according to the present embodiments.

Figure 21:
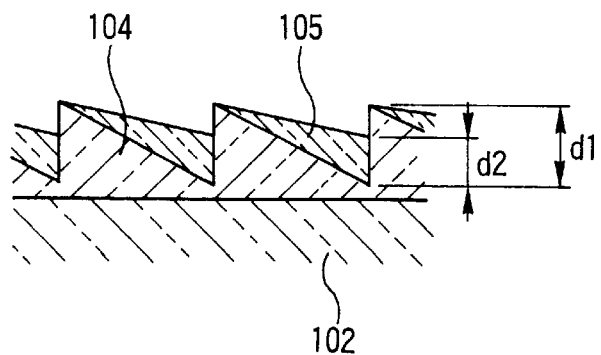
FIG. 21 is a sectional view for explaining another diffractive surface.
Figure 22:
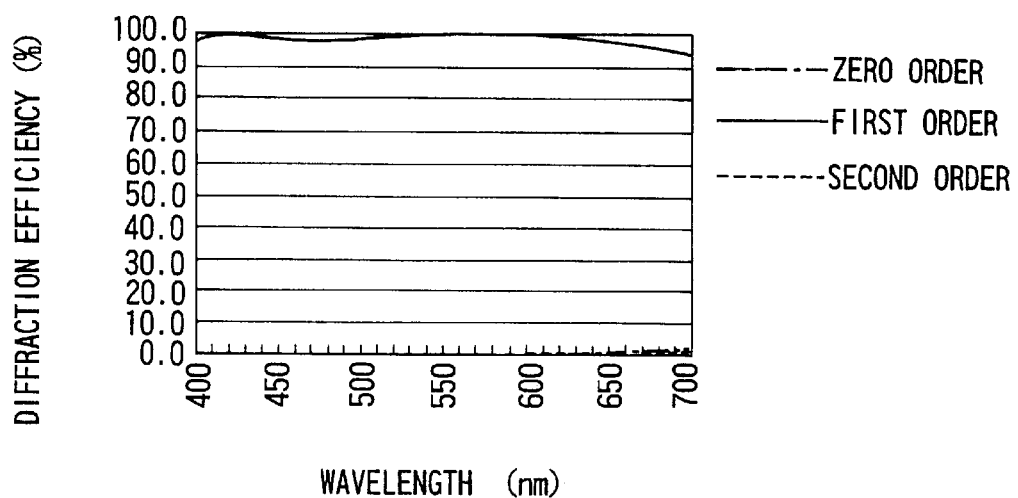
FIG. 22 is a diagram for explaining the wavelength-dependency characteristic of the diffractive surface shown in FIG. 21.

FIG. 22 shows the wavelength-dependent characteristic of the first-order diffraction efficiency in the diffractive surface shown in FIG. 21. As the concrete structure shown in FIG. 21, on a substrate 102, there is formed a first diffraction grating 104 made from an ultraviolet curable polymer (nd=1.499, vd=54), on which a second diffraction grating 105 made from another ultraviolet curable polymer (nd=1.598, vd=28) is formed. In such a combination of materials, the grating thickness d1 of the first diffraction grating is 13.8 μm, and the grating thickness d2 of the second diffraction grating is 10.5 μm.

As is apparent from FIG. 22, by employing the diffraction grating of the laminated structure, the diffraction efficiency at the design order becomes such a high diffraction efficiency as to be 95% or more over the whole useful wavelength range.

Figure 23:
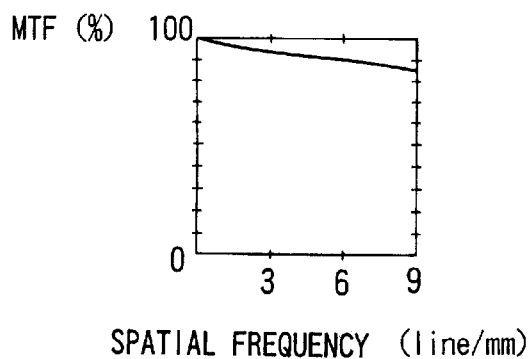
FIG. 23 is a diagram showing the MTF characteristic of the diffractive surface shown in FIG. 21.

FIG. 23 shows the MTF characteristic with respect to spatial frequency in the case of the diffraction grating of the laminated structure. By utilizing the diffraction grating of the laminated structure, the MTF in the low-frequency range is improved, thereby obtaining the desired MTF characteristic. As described above, the diffraction grating of the laminated structure is applied to the diffractive surface in the photographic lens according to the present embodiments, so that the optical performance is further improved.

Figure 24:
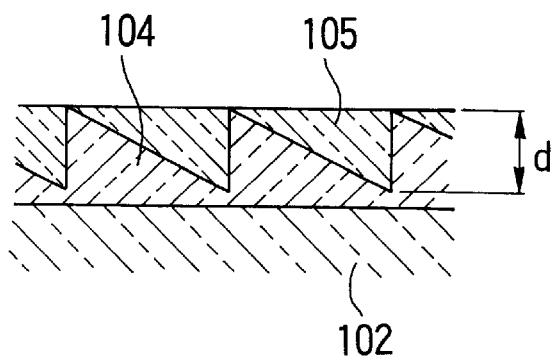
FIG. 24 is a sectional view for explaining a further diffractive surface.

It is to be noted that the material of the diffraction grating of the laminated structure forming the diffractive surface is not limited to ultraviolet curable polymers, but may be another plastic. Depending on the material of the substrate 102, the first diffraction grating 104 may be directly formed on the substrate 102. Further, it is unnecessary that the respective grating thicknesses differ from each other, and, depending on a combination of materials thereof, the two grating thicknesses may be made equal to each other as shown in FIG. 24. In this case, any recessions and protrusions of the grating shape are not formed on the diffractive surface, so that it is possible to provide an optical system which is excellent in dust-proofness, is an improvement in assembling work of diffraction gratings, and is less expensive.

According to the photographic lens in the present embodiments as described above, it is possible to attain a photographic optical system which is capable of correcting well chromatic aberration and other aberrations and the variations of the various aberrations due to focusing, and which has the high optical performance optimum for automatic focusing cameras in particular.

According to the photographic lens in the present embodiments as described above, it is possible to attain a photographic optical system which is capable of correcting well chromatic aberration and other aberrations and the variation of the various aberration due to focusing, and which has the high optical performance optimum for automatic focusing cameras in particular.

Next, an embodiment in which the photographic lens set forth in any one of the numerical examples 1 to 4 is applied to a camera will be described with reference to FIG. 25.

Figure 25:
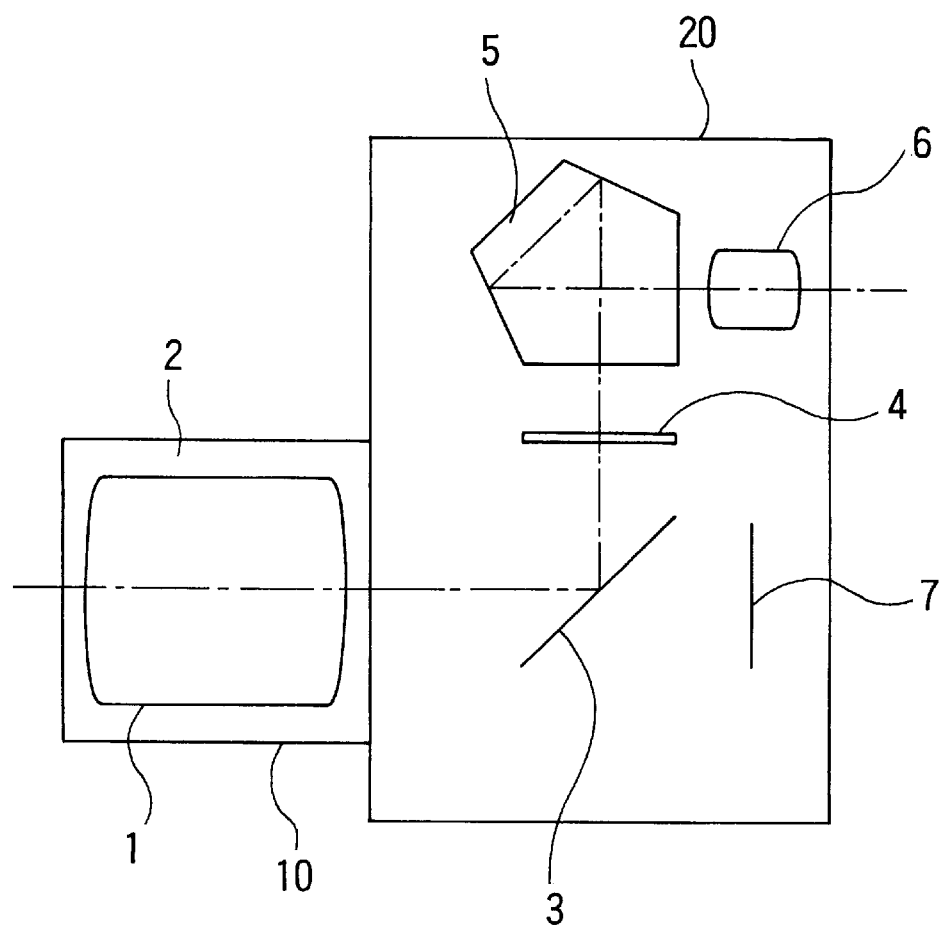
FIG. 25 is a schematic diagram showing the arrangement of a camera having an optical system according to any one of the numerical examples 1 to 4.

FIG. 25 is a schematic diagram showing the essential parts of a single-lens reflex camera. In FIG. 25, reference numeral 10 denotes a photographic lens composed of a lens system 1 according to any one of the numerical examples 1 to 4. The lens system 1 is held by a lens barrel 2 serving as a holding member. Reference numeral 20 denotes a camera body, which contains therein a quick-return mirror 3 for reflecting a light flux from the photographic lens 10 upward, a focusing screen 4 disposed in an image forming position of the photographic lens 10, a pentagonal roof prism 5 for converting an inverted image formed on the focusing screen 4 into an erecting non-inverted image, an eyepiece lens 6 for observing the erecting non-inverted image, etc. Reference numeral 7 denotes a film surface. During an exposure operation, the quick-return mirror 3 retreats from an optical path, so that an image is formed on the film surface 7 by the photographic lens 10.

The advantages as mentioned in the numerical examples 1 to 4 are effectively enjoyed by such a camera as disclosed in the present embodiment.

What is claimed is:

1. An optical system comprising, in order from an object side to an image side:

a first lens unit of positive optical power; and a second lens unit of negative refractive power, wherein focusing from an infinitely distant object to a closest object is effected by moving only said second lens unit toward the image side along an optical axis, and said second lens unit consists of one negative lens.

2. An optical system comprising, in order from an object side to an image side:

a first lens unit of positive optical power; and a second lens unit of negative refractive power, wherein focusing from an infinitely distant object to a closest object is effected by moving said second lens unit toward the image side along an optical axis, said second lens unit consists of one negative lens, and the following conditions are satisfied:

$d^2 L_1(\lambda)/d\lambda^2 > 0$ $d^2 T_1(\lambda)/d\lambda^2 > 0$ $\nu_2 > 30$ where $L_1(\lambda)$ is an aberration coefficient of longitudinal chromatic aberration of said first lens unit, $T_1(\lambda)$ is an aberration coefficient of lateral chromatic aberration of said first lens unit, $\lambda$ is a wavelength of light, and $\nu_2$ is an Abbe number of material of said negative lens of said second lens unit.

3. An optical system comprising, in order from an object side to an image side:

a first lens unit of positive optical power; and a second lens unit of negative refractive power, wherein focusing from an infinitely distant object to a closest object is effected by moving said second lens unit toward the image side along an optical axis, said second lens unit consists of one negative lens, and said first lens unit has at least one diffractive part.

4. An optical system comprising, in order from an object side to an image side:

a first lens unit of positive optical power; and a second lens unit of negative refractive power, wherein focusing from an infinitely distant object to a closest object is effected by moving said second lens unit toward the image side along an optical axis, said second lens unit consists of one negative lens, and said first lens unit has at least one diffractive part of positive optical power composed of a diffraction grating of rotational symmetry with respect to the optical axis, at lest one positive lens, and at least one negative lens.

5. An optical system according to claim 4, wherein the following conditions are satisfied:

$0.005 < \phi_D/\phi < 0.1$ $50 < \nu_{1P} < 96$ $25 < \nu_{1N} < 60$ where $\phi_D$ is an optical power of said at least one diffractive part with respect to diffracted light of a design diffraction order in a design wavelength, $\phi$ is an optical power of the entire optical system in the design wavelength, $\nu_{1P}$ is an average value of Abbe numbers of materials of said at least one positive lens, and $\nu_{1N}$ is an average value of Abbe numbers of materials of said at least one negative lens.

6. An optical apparatus comprising:

an optical system according to any one of claims 1 to 5; and means for holding said optical system.

7. An optical system according to claim 1, wherein said first lens unit has a diffractive part of positive optical power.

8. An optical system according to claim 1, wherein the following conditions are satisfied:

$0.005 < \phi_D/\phi < 0.1$ where $\phi_D$ is an optical power of said diffractive part and $\phi$ is an optical power of the entire optical system.

* * * * *

UNITED STATES PATENT AND TRADEMARK OFFICE
CERTIFICATE OF CORRECTION

PATENT NO. : 6,381,079 B1
DATED : April 30, 2002
INVENTOR(S) : Hideki Ogawa

It is certified that error appears in the above-identified patent and that said Letters Patent is hereby corrected as shown below:

Column 3,
Line 17, "FIG. 1" should read -- FIG. 1 is --.

Column 8,
Line 18, "-$N_{Mi}(\lambda))$" should read -- -$N_{Mi}(\lambda_0))$ --;
Line 41, "$h^2_D$" should read -- $h_D^2$ --, and "$h^2_M$" should read -- $h_M^2$ --;
Line 51, "(b)"" should read -- (b)' --; and
Line 55, "$h^2_D$" should read -- $h_D^2$ --, and "$h^2_M$" should read -- $h_M^2$ --.

Column 9,
Line 1, "$h^2_M$" should read -- $h_M^2$ --.

Column 14,
Line 64, "and a negative lens" should be deleted.

Column 18,
Table 1, "$d^{22}LL_{11}((\lambda);d\lambda^{22}$" should read -- $\frac{d^2 L_1(\lambda)}{d\lambda^2}$ --;

Table 1, "$dd^{22}TT_{11}((\lambda);d\lambda^{22}$" should read -- $\frac{d^2 T_1(\lambda)}{d\lambda^2}$ --; and Line 63, "lens.," should read -- lens, --.

Column 22,
Line 3, "lest" should read -- least- --.

Signed and Sealed this

Twenty-second Day of October, 2002

*Attest:*

*Attesting Officer*

JAMES E. ROGAN
*Director of the United States Patent and Trademark Office*